US012155292B2

(12) United States Patent
Papi

(10) Patent No.: US 12,155,292 B2
(45) Date of Patent: Nov. 26, 2024

(54) REGENERATIVE ENERGY SYSTEM

(71) Applicant: RegenX Systems SAS, La Ricamarie (FR)

(72) Inventor: Lu Papi, Newport (AU)

(73) Assignee: RegenX Systems SAS, La Ricamarie (FR)

( * ) Notice: Subject to any disclaimer, the term of this patent is extended or adjusted under 35 U.S.C. 154(b) by 136 days.

(21) Appl. No.: 17/801,923

(22) PCT Filed: Feb. 26, 2021

(86) PCT No.: PCT/AU2021/050170
§ 371 (c)(1),
(2) Date: Aug. 24, 2022

(87) PCT Pub. No.: WO2021/168519
PCT Pub. Date: Sep. 2, 2021

(65) Prior Publication Data
US 2023/0100257 A1    Mar. 30, 2023

(30) Foreign Application Priority Data

Feb. 27, 2020    (AU) .................................. 2020900564

(51) Int. Cl.
*H02K 7/116*    (2006.01)
*H02K 7/18*    (2006.01)
(Continued)

(52) U.S. Cl.
CPC ........... *H02K 7/116* (2013.01); *H02K 7/1807* (2013.01); *H02K 51/00* (2013.01); *H02K 53/00* (2013.01)

(58) Field of Classification Search
CPC ...... H02K 7/116; H02K 7/1807; H02K 51/00; H02K 53/00; H02K 49/106; H02K 7/1163;
(Continued)

(56) References Cited

U.S. PATENT DOCUMENTS 5,931,212 A * 8/1999 Mullet .................... F16D 41/04
74/625
7,902,708 B2    3/2011 Elmaleh
(Continued)

FOREIGN PATENT DOCUMENTS

CN    103023206 A    4/2013
CN    110094483 A    8/2019
(Continued)

OTHER PUBLICATIONS

Abb Inc.: "Advanced Direct-Drive Generator for Improved Availability of Oscillating Wave Surge Converter (OWSC) Power Generation Systems", *Final Technical Report*, dated Mar. 3, 2017, 169 pages.
(Continued)

*Primary Examiner* — Michael C Zarroli
(74) *Attorney, Agent, or Firm* — McCarter & English, LLP

(57) ABSTRACT

A regenerative energy system comprises a power source driving a motor that rotates a drive gear about an axis, the drive gear rotating a driven gear about an axis. The drive and
(Continued)

driven gears each comprise radially extending teeth projecting from respective gear peripheries, the teeth meshing when the drive gear drives the 5 driven gear. Permanent magnets are disposed in at least some of the drive and driven gear teeth such that the magnetic poles of the drive gear teeth repel the poles of the driven gear teeth. When magnetic repulsive forces between the drive and driven gear teeth are overcome, the drive gear and driven gear teeth can engage one another. A coil is located in proximity to the permanent magnets. The 0 coil can form part of a solenoid. Electrical current is generated in the coil by a movement of the permanent magnets relative to the coil.

15 Claims, 20 Drawing Sheets

(51) Int. Cl.
*H02K 51/00* (2006.01)
*H02K 53/00* (2006.01)

(58) Field of Classification Search
CPC .... H02K 49/102; H02K 49/108; H02K 47/00; F16H 55/06; F16H 57/0006; F16H 1/06; F16H 57/08; F16H 2057/02069; F16H 49/005; F16H 3/44; F16H 15/48; F16H 2200/20; Y02E 10/72; F05B 2260/40311; H02M 7/54
See application file for complete search history.

(56) References Cited

U.S. PATENT DOCUMENTS

| | | |
|---|---|---|
| 2004/0080227 A1 | 4/2004 | Tung Kong et al. |
| 2012/0326541 A1 | 12/2012 | Palmer et al. |
| 2015/0042193 A1 | 2/2015 | Galvan |
| 2021/0215157 A1* | 7/2021 | Dawn ...................... F04C 2/00 |

FOREIGN PATENT DOCUMENTS

| | | |
|---|---|---|
| JP | 2016-200228 A | 12/2016 |
| JP | 2019-22427 A | 2/2019 |
| WO | WO 2019/242427 A1 | 12/2019 |

OTHER PUBLICATIONS

Jørgensen, Frank T.: "Design and construction of permanent magnetic gears", Aalborg University, copyright Frank T. Jørgensen 2010, pp. 1-127.

Shi, Chaojie et al.: "A Novel Linear Permanent Magnet Vernier Machine With Consequent-Pole Permanent Magnets and Halbach Permanent Magnet Arrays", *IEEE Transactions on Magnetics*, vol. 53, No. 11, Nov. 2017, 4 pages.

International Search Report and Written Opinion prepared by the Australian Patent Office, acting as the International Searching Authority, for international application PCT/AU2021/050170 dated Apr. 12, 2021.

* cited by examiner

COVER PLATES REMOVED FOR CLARITY (Sun Gear Housing)

(Planetary Gear Housing)

(Ring Gear Housing)

(Magnetic gear tooth)

(Gearbox)

(Gearbox Cross-Section)

(Gearbox)

(Gearbox Cross-Section)

(Gearbox)

REGENERATIVE ENERGY SYSTEM

CROSS-REFERENCE TO RELATED APPLICATIONS

This application is the National Stage entry under 35 U.S.C. § 371 of International Application Number PCT/AU2021/050170 filed on Feb. 26, 2021, published on Sep. 2, 2021 under publication number WO 2021/168519 A1, which claims the benefit of priority under 35 U.S.C. § 119 of Australian patent application number 2020900564 filed Feb. 27, 2020.

TECHNICAL FIELD

The present disclosure relates to a system for energy regeneration and, in particular, to a system for generation of electrical power in a gearbox of a transmission.

BACKGROUND ART

Mechanical gears are widely known and used in industry. The teeth of mechanical gears can wear out over time, and thus mechanical gears typically require careful alignment and lubrication in order to perform adequately over a required time period.

The failure of gearboxes in a transmission system is one of the main reasons for mechanical break downs. For example, gearbox failure in wind turbines represents approximately between 16 and 22% of down time.

Conventional gearboxes are noisy when gears engage with other gears. Full gear-to-gear contact gearboxes are also prone to wear and demand constant and complex maintenance and complicated automatic lubrication systems. This can especially be the case when such gearboxes are installed in wind turbines. For example, overheating of lubricating systems and oils is a not unusual reason for a fire occurring in a wind turbine.

In some applications, a magnetic field has been applied to mechanical gears to keep the gears apart, thus reducing the wear. For magnetically assisted mechanical gears, the drive gear powers the driven gear through a magnetic field. The teeth of a first gear levitate relative to the teeth of an adjacent second gear with which the first gear is meshed due to the magnetic offset. Although there is an air gap, under normal load, the gears do not touch. Thus, during normal usage, the magnetically assisted mechanical gears are able to rotate without touching one another. Using a magnetically driven gear box may therefore result in a quieter gear box.

Further, it is known to equip electrically powered boats and yachts with DC motors. The DC motors can be operated to drive a propeller shaft to in turn drive the boat. In addition, when a yacht is sailing under the power of the wind, the DC motor can be allowed to rotate due to a rotation of the propeller as the boat sails through the water, thus recharging the boat batteries from the DC motor.

A DC motor typically operates at approximately 20% efficiency at low speeds and up to approximately 85% at high speeds. In DC motor applications, such as electrically powered boats, it is therefore generally considered better to employ a transmission, and then use one or more small motors that rotate at high speeds. However, conventional transmissions that comprise a gear box can have an associated high level of friction and can require careful alignment in an attempt to reduce such friction. In addition, although they are more efficient than brushed motors, brushless motors and AC motors are generally not used with electrically powered boats since they can have poor regenerative efficiencies.

US20040080227 discloses a system for converting a direct current from a variable power source into an alternating current or mechanical movement. The system employs a variable coupling arrangement that comprises two plates with magnets that locate into the gap formed by magnets of the opposing plate. One of the plates is connected to the variable power source while the other is connected to an electrical generator or an external device. The arrangement of magnets is such that the repulsive force between them causes rotation of the second plate when the first plate rotates. The resulting movement of the second plate is converted to either a mechanical movement through gears or electrical current through gears connected to a generator. However, in US20040080227 there is no disclosure of a regenerative aspect (such as coils being located near to/within gears comprising magnets to produce current). Further, the magnets of the two plates are not configured to engage one another; in fact, were this to occur, the resulting transfer of forces would cause a shearing of the magnets from each of the plates. Thus, the system cannot act as both a conventional and a magnetically assisted gear system, nor does it comprise a regenerative aspect.

US20150042193 discloses a self-generating energy system that utilizes a dual core generator coupled to a transmission system. However, US20150042193 does not disclose magnetically assisted gears that can also function as a conventional gear system.

US20120326541 discloses a regenerative motor system. However, the system is focussed on the ability to vary/add torque to an output from a motor using an epicyclic gear system. Again, US20120326541 does not disclose the use of a magnetically assisted gear system that can also function as a conventional gear system.

Shi et. al. (IEEE TRANSACTIONS ON MAGNETICS, VOL. 53, NO. 11, NOVEMBER 2017) discloses a system that combines a co-axial magnetic gear with other components such as a clutch, lock and other machines to provide multiple paths for power flows in an electric vehicle. Again, Shi et. al. do not teach coupling magnets to the teeth of a conventional gear system to enable them to regenerate electricity.

It is to be understood that, if any prior art is referred to herein, such reference does not constitute an admission that the prior art forms a part of the common general knowledge in the art, in Australia or any other country.

SUMMARY

Disclosed herein is a regenerative energy system. The system as disclosed herein can find application in a variety of technical fields and contexts, including: all types of marine gearboxes including those employed in electrically powered boats and yachts; wind generation towers; conveyors; hoists; electric bikes and electric scooters; automation (including linear actuators and robots); electric tools (such as electric screwdrivers; in the petrochemical and oil and gas industries (including in pumps and valving); in irrigation systems, etc.

The system as disclosed herein can comprise a power source that is configured to drive a motor that rotates a drive gear about a drive gear axis. The drive gear can comprise teeth that can be arranged to extend radially from a periphery of the drive gear. Depending on the type of gear, the periphery of the drive gear may be an external or internal periphery of the drive gear.

The system can also comprise a driven gear. The driven gear can comprise radially extending teeth arranged to project from a periphery of the driven gear (e.g. external or internal periphery). The driven gear can be arranged to mesh with the teeth of the drive gear such that the driven gear is rotated about a driven gear axis when the drive gear is rotated by the motor.

Each of the gears as disclosed herein can generally take the form of a mechanical gear, comprising a disc/plate/housing, tooth profiles, addendum, tooth clearance, pressure angle and dedendum. Each of the gears as disclosed herein can be embodied in a gearbox as a sun gear, planet gear, ring gear, etc.

The system can also comprise permanent magnets disposed in each of at least some of the teeth of the drive gear and the driven gear. The poles of the permanent magnets in the drive gear teeth can be arranged to repel the corresponding magnet-comprising teeth of the driven gear in-use.

The system is further configured such that, when magnetic repulsive forces between the teeth of the drive gear and driven gear are overcome, the teeth of the drive gear and driven gear can be arranged to engage with one another (i.e. in a conventional manner). This engagement may occur, for example, during a rapid motor start-up, sudden change (e.g. increase or decrease) in gear speed, when there is a high torque output from the motor, etc.

In contradistinction to US20040080227 and US20120326541, both of which disclose rectangular plate magnets or round pin magnets that extend in an axial direction, the radially extending peripheral teeth of the present system are configured to engage with each other such as when magnetic repulsive forces between the teeth of the drive gear and driven gear are overcome. The present system can thus function in both a magnetically-assisted as well as a conventional gearbox mode, and such engagement will not result in the magnet becoming dislodged from or sheared off the gear, as would readily occur with each of e.g. US20040080227 and US20120326541.

The system as disclosed herein can also comprise a coil in proximity to the permanent magnet. The system may, for example, comprise one or more such coils. In accordance with the disclosure, electrical current can be generated in the coil(s) by a movement of the permanent magnet relative to the coil(s). In this way, energy for the system can be regenerated. The system may also reduce friction, vibration and wear while, at the same time, allow for the harvesting/reuse of energy such as power.

Further, when magnetically assisted mechanical gears are employed in a transmission, they may also improve energy efficiency within the transmission. Thus, the system of the present disclosure may provide a transmission that is more energy efficient, optionally at all speeds of motor operation.

In normal operation of the system, there is no friction nor a need for careful alignment in relation to the magnetically assisted mechanical gears. Thus, the losses within the system may be kept to a minimum. In addition, generation of electrical current can be continuous, simultaneously drawing electrical energy to drive the magnetically assisted mechanical gears whilst also returning the electrical energy that is generated within the coil(s) to the power source, etc. As above, such a system may be highly energy efficient. However, as stated above, the system can operate in a conventional manner when magnetic repulsive forces between the teeth of the drive gear and driven gear are overcome.

In some embodiments, the generated electrical current may be transferred to the power source. In another embodiment, the generated electrical current may additionally or alternatively be transferred to a control system that forms part of the overall system. In yet another embodiment, the generated electrical current may additionally or alternatively be transferred to auxiliary services of the overall system or to a system that is auxiliary of the regenerative energy system. The overall system can be as set forth above (e.g. it can form part of a marine drive/transmission; a wind generation tower/system; a conveyor; a hoist; an electric bike or scooter; an automation application such as a linear actuator or robot; an electric tool such as an electric screwdriver; a pump; a control valve; etc.).

In some embodiments, the generated electrical current may be transferred to the power source simultaneously and continuously whilst the power source is driving the motor.

In some embodiments, each of the teeth of the drive gear and driven gear may comprise a permanent magnet disposed therein. For example, a permanent magnet may define, or it may be formed into, the teeth of the drive gear and the driven gear. When the permanent magnet forms a tooth of the gear, it may be securely mounted into a disc/plate/housing of the gear.

In some embodiments, the permanent magnet of each of the drive gear and the driven gear may locate in proximity to the coil(s) such that a movement of the permanent magnet of the driven gear relative to the coil(s) can generate electrical current. For example, the coil(s) may be positioned within a gearbox in proximity to both the drive gear and the driven gear (as well as other gear(s) present within the gearbox). Further, the electrical current generated by the movement of the permanent magnets relative to the coil(s) may be transferred to one or more of the: power source, control system, or auxiliary services of the overall system.

In some embodiments, an axis of the driven gear may be parallel to but offset from an axis of the drive gear.

In some embodiments, an input shaft may be connected to the drive gear and an output shaft may be coupled to the driven gear. Various means known in the art can be employed to connect the input shaft to the drive gear and the output shaft to the driven gear. Further, the input shaft may be connected to an output shaft of the motor. Additionally, the output shaft of the gearbox may be connected to a shaft of an impeller, propeller, turbine, other shaft, etc.

In some embodiments, the output shaft may be directly or indirectly coupled to the driven gear. For example, the output shaft may be directly coupled to the driven gear in the form of a sun gear. In another example, the output shaft may be indirectly coupled to the driven gear via an output gear in the form of a ring gear (e.g. the output shaft may be directly connected to the output gear (e.g. ring gear), with the output gear coupling to the driven gear, and wherein the driven gear may be an intermediate gear in the gearbox such as a planet gear that locates adjacent to a drive gear—e.g. a sun gear).

In some embodiments, the output shaft may comprise a permanent magnet and teeth that engage with teeth of the drive gear and/or driven gear. The output shaft teeth may form part of an output gear (e.g. sun or ring gear) that can be rotatably driven about an output shaft axis by a relative rotation of the drive gear and/or driven gear. Again, the output shaft teeth may comprise the permanent magnet (e.g. a permanent magnet may define or be formed into one or more of the teeth thereof). Again, the output gear can comprise radially extending teeth arranged to project from a periphery of the output gear (e.g. from an external or internal periphery thereof).

In a variation, the configuration and operation of a gearbox comprising the drive gear, driven gear and output gear can be reversed, whereby the output gear becomes an input gear of the gearbox (i.e. connected to the input shaft).

In some embodiments, the permanent magnets of the output shaft may also locate in proximity to the coil(s). Thus, a movement of the permanent magnets of the output gear relative to the coil(s) can generate electrical current.

In some embodiments, the electrical current generated by the movement of the permanent magnets of the output shaft relative to the coil(s) may be transferred to one or more of the: power source; control system for the overall system; auxiliary services of the overall system.

In some embodiments, the drive gear axis and output shaft axis may be colinear. This can allow for a compact and balanced gearbox to be designed.

In some embodiments, typically each of the drive gear axis, driven gear axis, output gear axis and the one or more coil(s) may be fixed in space relative to one another. Such fixing can employ bearings and supports as known in the art. Such fixing can be within a gearbox that houses each of the gears.

In some embodiments, when an output gear of the output shaft is a ring gear, at least one of the driven gear, the output gear and the coil(s) may be located at least partially within an annular hollow of the output ring gear.

In some embodiments, an exposed surface of the teeth comprising the permanent magnets disposed therein (e.g. when formed as the teeth of any one of the drive gear, driven gear or output gear respectively) may comprise a protective layer that employs a non-brittle material. For example, the non-brittle material may comprise: silicone rubber, POM plastic, a metal with low electromagnetic permeability such as aluminium or stainless steel, etc. The protective layer may be configured to protect the permanent magnets in each of the teeth when the magnetic repulsive forces between the teeth are overcome.

In some embodiments, the drive gear may be a ring gear. In another embodiment, the drive gear may be a sun gear. In yet another embodiment, the drive gear may be a planetary gear.

In some embodiments, the driven gear may be a planetary gear. This can allow for a planetary gearbox to be designed. Such a gearbox can be designed to be highly efficient and capable of transmitting high torque. In this regard, the concentricity of planetary gear orbits can be ideal for torque transmission through a single axis. This can also allow the gearbox to have a compact design and can facilitate ideal integration of power-harvesting while, at the same time, allowing for a reduction of wear.

In some other embodiments, the driven gear may be a ring gear. The ring gear may be rotated by one or more planetary gears located within the ring gear. One or more of these planetary gears can be the drive gear. Further, the one or more planetary gears may be located in proximity of a sun gear. Instead, this sun gear can be the drive gear.

In some embodiments, the drive gear may be larger than the driven gear or vice versa. In each case, the driven gear axis may be parallel to and offset from the drive gear axis.

In some embodiments, the coil(s) may be arranged to remain stationary relative to each of the drive gear, driven gear and output gear. For example, the coils may be fixed within the gearbox, whilst the gears rotate in the gearbox in proximity of the fixed coils.

In some embodiments, the coil(s) may be arranged within a coil housing, which may take the form of a solenoid. For example, two such coils may be arranged with each coil housing to form a solenoid device. Further, multiple (e.g. three) solenoid devices may be arranged within the gearbox (e.g. spaced equidistantly around the gearbox) in proximity to one, some or typically all of the gears comprising permanent magnets.

For example, a given solenoid device may be arranged within the gearbox in proximity to each of: a drive gear (e.g. next to a sun gear, or within and adjacent to a ring gear); one or two planetary gears (e.g. one planetary gear located adjacent to either end of the solenoid device); an output gear (e.g. within and adjacent to a ring output gear, or next to a sun gear). This can maximise electricity harvesting and generation. Other variations are also contemplated and are set forth is further detail hereafter.

In some embodiments of the regenerative energy system when in use, and when the motor is not operating to rotate the drive gear, the drive gear may be manually rotated about the drive gear axis such that electrical current is generated in the coil(s). This manual rotation may occur by virtue of movement of the vessel, vehicle or other apparatus in which the system (e.g. gearbox) is employed, as set forth below.

In some embodiments, the motor of the regenerative energy system can comprise a DC motor which can e.g. drive a transmission. In other embodiments, a brushless or AC motor can be used in place of the DC motor. The regenerative energy system can be used within the gearbox of such a transmission.

For example, when the regenerative energy system is used between e.g. a propeller and a motor of a boat, etc. the coil(s) placed inside the rotating magnetic field generated by the gears fitted with permanent magnets can be used to generate power when the magnets of the magnetic gears are rotated to move relative to the coil. In use, the regenerative energy system is thus able to generate electrical current to recharge the power source, etc. (e.g. simultaneously whilst a DC motor is operating to drive the boat, etc.).

In another example, when a boat is sailing under the power of the wind, the motor may optionally be operated to drive the boat. Further, in some arrangements, the motor may be fitted with a fixed blade propeller, wherein the propeller may be disengaged from the motor, by e.g. a clutch, so as to freely rotate. The rotation of the propeller through the water in this arrangement can drive the magnetic gears of the transmission so as to generate electrical current to recharge the power source, etc.

Also disclosed herein is a magnetic gear assembly. The magnetic gear assembly may form part of a gearbox, such as may be employed in the various applications and transmissions as outlined above.

The magnetic gear assembly can comprise an electrical power source that is electrically connected to at least one driving motor;

The magnetic gear assembly can also comprise an input shaft coupling the at least one driving motor to a drive gear. The drive gear can have radially extending magnetised (magnetic) teeth that can be arranged to extend from a periphery (e.g. external or internal) of the drive gear and can be rotated by the driving motor.

The magnetic gear assembly can further comprise an output shaft coupled to the drive gear and/or a driven gear. The driven gear can have radially extending magnetised (magnetic) teeth that can be arranged to project from a periphery (e.g. external or internal) of the driven gear and magnetically engaged with the teeth of the drive gear, and that can be rotated relative to the drive gear by rotation of the drive gear.

The magnetic gear assembly can additionally comprise at least one coil in proximity to the magnetised (magnetic) teeth of the drive gear and/or driven gear.

In accordance with the disclosure, electrical current can be generated in the at least one coil by a movement of the magnetised (magnetic) teeth relative to the at least one coil.

In some embodiments of the magnetic gear assembly, the at least one coil may be electrically connected to the power source to contribute electrical charge to the power source. Additionally or alternatively, the at least one coil may be electrically connected to a control system and/or to auxiliary services. Such a control system and auxiliary services may form part of an overall system in which the magnetic gear assembly is employed.

In some embodiments of the magnetic gear assembly, one or more intermediary gears may be coupled to the drive gear and/or the driven gear. For example, two or more intermediary gears may be configured to rotate co-axially about an intermediary shaft to which they are fixed.

In some embodiments of the magnetic gear assembly, the magnetic gear assembly may further comprise a flywheel. The flywheel may be configured to be rotatably driven by the output shaft. The flywheel may comprise one or more permanent magnets that are configured to interact with the at least one coil, or with a secondary coil. The flywheel may be configured such that electrical current may be generated in the at least one coil or secondary coil by a movement of the one or more permanent magnets relative to the at least one coil or secondary coil. Again, the electrical current generated by the movement of the one or more permanent magnets relative to the at least one coil or secondary coil may be transferred to one or more of the: power source; control system for the overall system; an auxiliary system or auxiliary services of the overall system.

BRIEF DESCRIPTION OF THE DRAWINGS

Specific embodiments will now be described, by way of example only, with reference to the accompanying drawings in which.

DETAILED DESCRIPTION

Figure 1A:
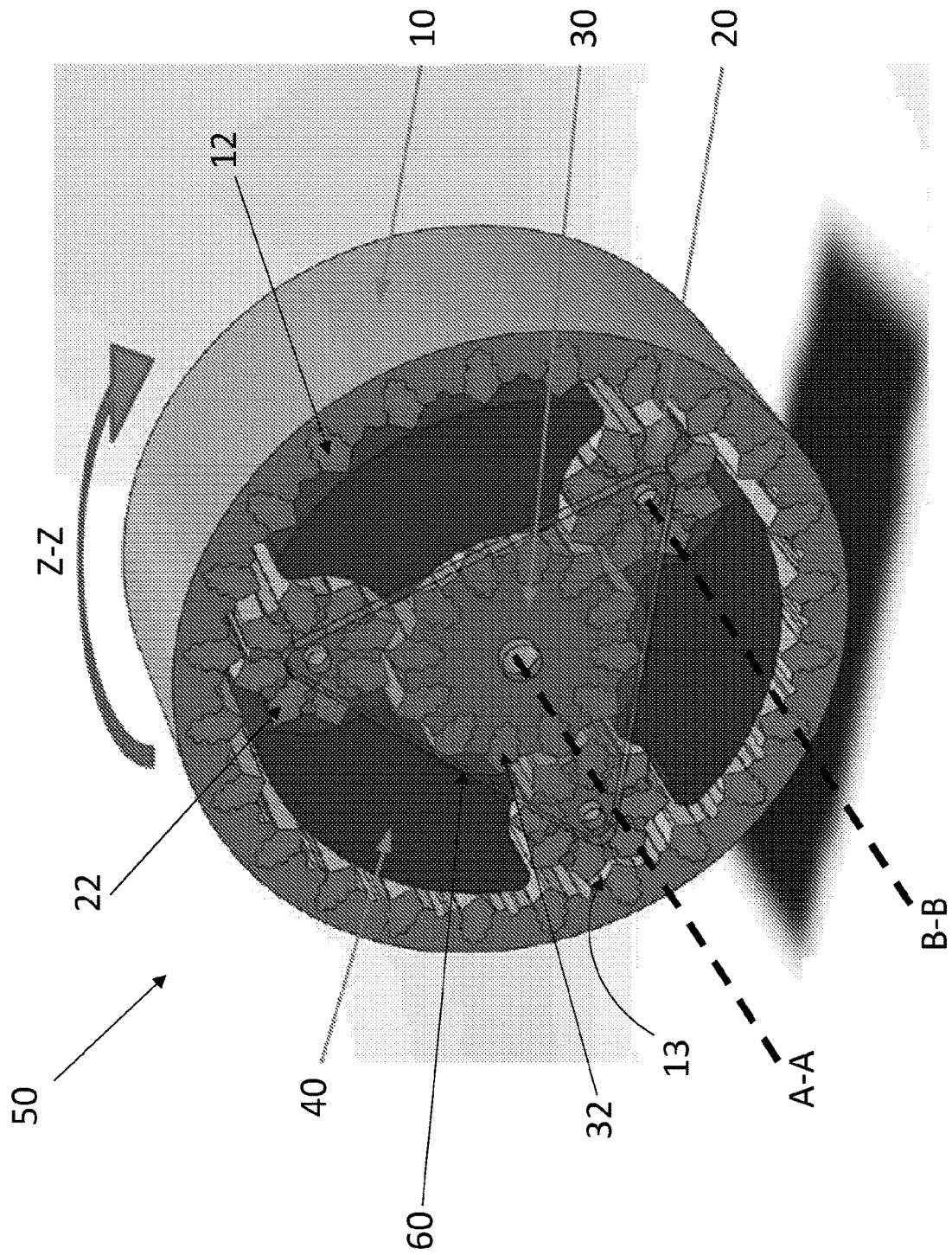
FIGS. 1A and 1B shows perspective and front views of a first embodiment of the gear assembly of a regenerative energy system, respectively.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Specific embodiments of a regenerative energy system will now be described in relation to the drawings as a regenerative gearbox system 100. Further embodiments employ the numbering 100', 100", 100'''.

The system 100 comprises a power source that is configured to drive a motor 70. The motor 70 is arranged to rotate a drive gear (e.g. via a motor output shaft 71 connected to a gearbox input shaft 14) about a drive gear axis (A-A). The drive gear can take various forms as set forth hereafter.

The drive gear comprises radially extending teeth that are arranged to project from a periphery of the drive gear. The periphery can be an external or internal periphery of the drive gear (e.g. in the latter case, the gear may be a ring gear, and the teeth may project radially inwards from an inner peripheral circumference of the ring gear).

The system 100 also comprises a driven gear. Again, the driven gear can take various forms as set forth hereafter. The driven gear also comprises radially extending teeth arranged to project from a periphery (i.e. external or internal) of the driven gear. As explained in further detail hereafter, the driven gear is arranged to mesh with the teeth of drive gear such that the driven gear is rotated about a driven gear axis when the drive gear is rotated by the motor 70.

Figure 8B:
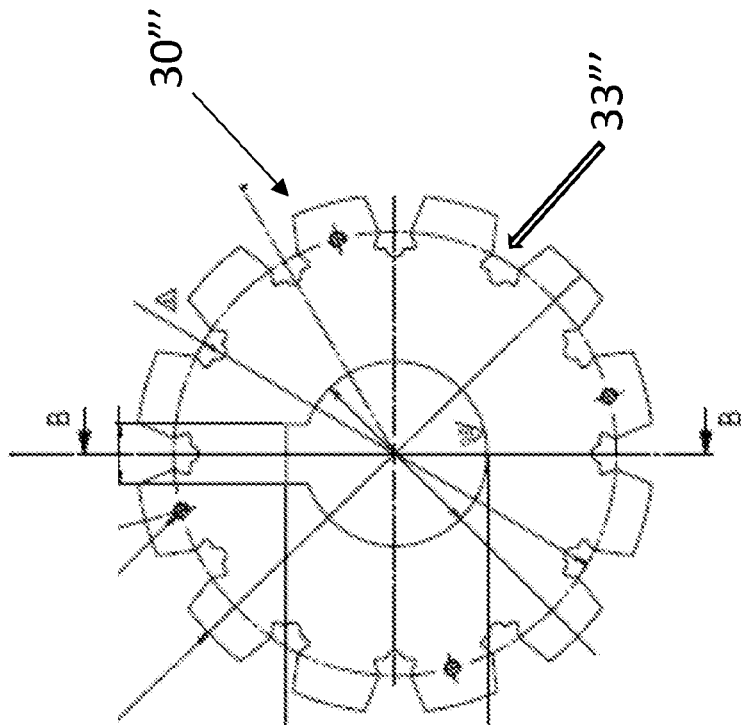
FIGS. 8A, 8B and 8C show front views of the gear housings/plates of the planetary, sun and ring gears respectively for the fourth embodiment of the gear assembly.
Figure 8A:
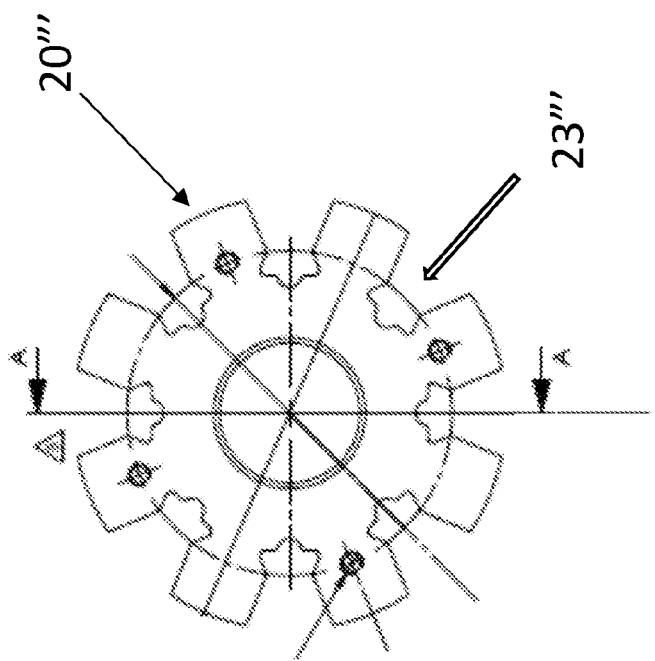
Figure 8C:
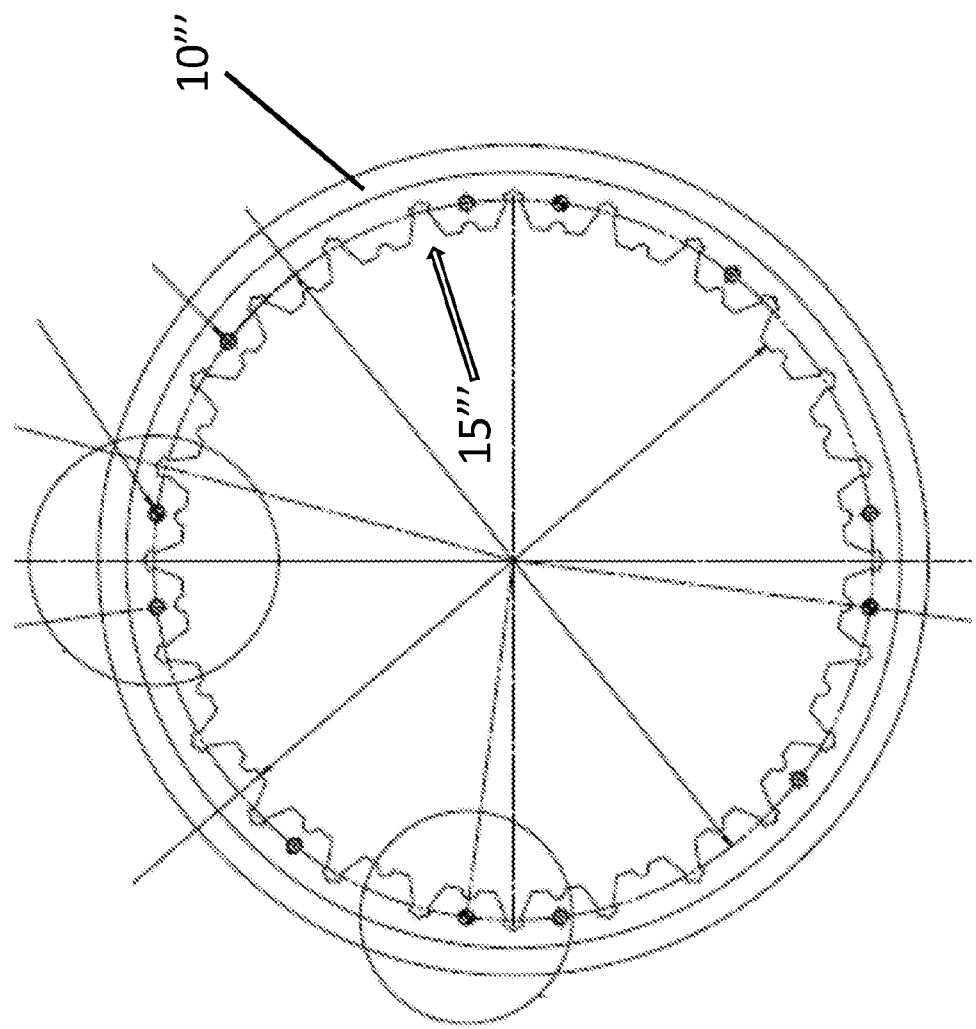
Figure 8D:
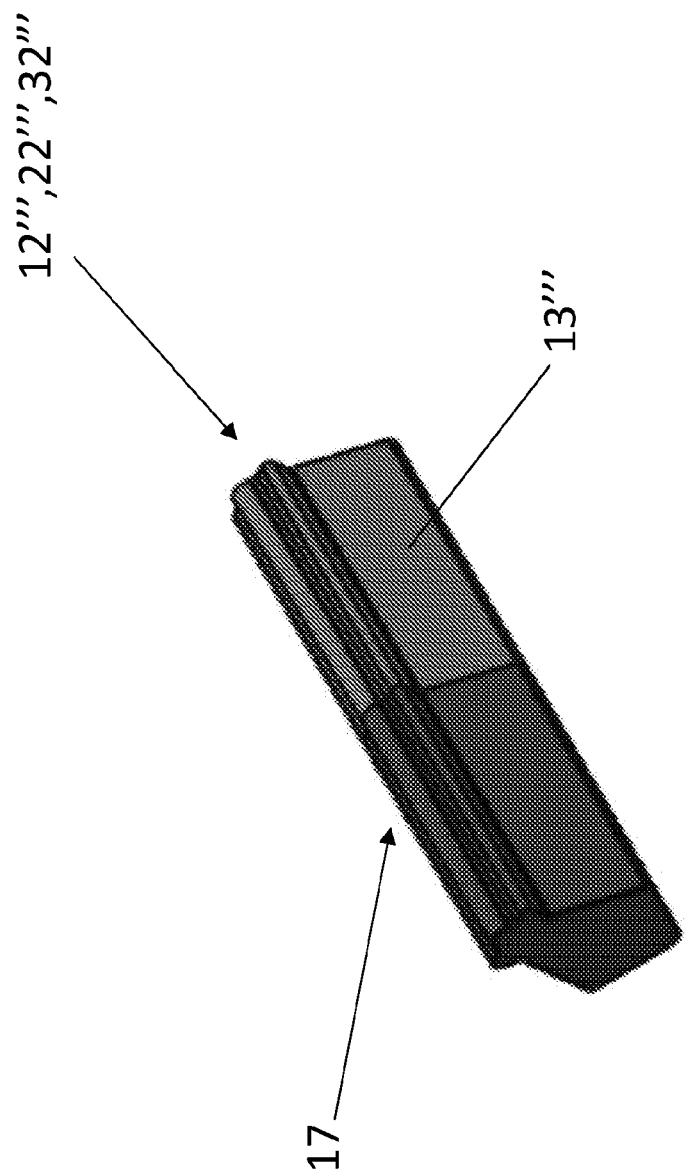
FIG. 8D shows a perspective view of a gear tooth for the fourth embodiment of the gear assembly.

The system 100 further comprises permanent magnets disposed in at least some of the teeth (e.g. 12, 22, 32) of each of the drive gear, driven gear and an input/output gear. An example of such a magnet/tooth is shown in FIG. 8D. The permanent magnets can define the teeth or may be covered/coated or otherwise incorporated into the teeth. The magnets are arranged such that the poles of the permanent magnets in the drive gear teeth repel the corresponding magnet-comprising teeth of the driven gear and/or input/output gear in use. However, in accordance with the disclosure, the magnets are also arranged such that, when magnetic repulsive forces between the teeth of the drive gear and driven gear are overcome, the teeth of the drive gear, driven gear and/or input/output gear are able to engage with one another (i.e. in a conventional manner such as occurs in a conventional gearbox). Thus, the system 100 is configured to function in both a magnetically-assisted mode and in a robust, conventional gearbox mode.

The system 100 further comprises a coil in proximity to the permanent magnets. As set forth hereafter, a number of such coils can be arranged in proximity to a number of the permanent magnets disposed in a number of the gears of the system. This enables electrical current to be generated in the or each coil by a movement of the permanent magnets relative to the coil. The coils can be embodied in a solenoid in the gearbox.

More particularly, the disclosed regenerative gearbox system 100 harnesses the concept of electromagnetic induction and applies the principals to a gearbox assembly 50 so as to harvest the otherwise wasted potential for electric current generation from the kinetic movement of the gears 10, 20, 30 relative to coil(s) forming part of solenoids 40. FIGS. 1 to 9 illustrate four embodiments of a regenerative energy system 100, 100', 100" and 100'" each having a respective gearbox assembly 50, 50', 50", 50'". Where like numbers are used, unless described otherwise, the features of the embodiments of the regenerative gearbox system 100' (FIGS. 3 to 4), 100" (FIGS. 5 to 7) and 100'" (FIGS. 7, 8 to 9) are the same as those in the first embodiment of the regenerative gearbox system 100 (FIGS. 1 to 2). Further, the location of each coil in a given solenoid 40 is shown more clearly in the fourth embodiment of FIGS. 8 to 9.

Electricity can be produced in generators that comprise coils of wires and magnets. The coil is either moved through the magnetic field of a static magnet, or the coil can remain stationary whilst the magnet, and magnetic field moves relative to the coil. Regardless, the underlying principle relies on the coil or coils being exposed to a changing magnetic field created by the relative movement of the coil and the magnet. The changing magnetic field causes the electrons in the coil to flow, thus creating an electric current that is conducted through the wire of the coil. The present disclosure applies this concept to the gears of a transmission thereby converting a gearbox 50 of a transmission into a generator that is capable of returning electrical energy to the power source that operates the motor 70. The regeneration of electrical energy from within the transmission, and the return of that energy to the power source of the transmission, can thus improve the overall energy efficiency and performance of the transmission.

The returned electrical energy may alternatively pass into a control system, wherein the distribution of electrical power is regulated. In this form, the control system can also comprise a battery that receives the electrical power converted from the gearbox 50.

In a further alternative, returned electrical energy may pass into auxiliary components/services of the system or another (e.g. parallel) system. Further, the system 100 can be configured to regulate distribution of electrical power between each of the power source, control system and auxiliary components/services/systems.

It would be appreciated by one skilled in the art that, whilst the present embodiments are described in relation to a gearbox and/or transmission specifically, the disclosed regenerative energy system can be applied to any motor driven gear assembly and also to auxiliary systems.

As seen in FIGS. 1, 2, 4, 6 and 7, the regenerative gearbox system 100 utilises a motor 70 (FIG. 2A) with a motor output shaft 71 coupled to drive an input shaft 14 that is configured to engage and rotate a drive gear about the centrally located input shaft axis A-A. The motor 70 is provided with an input of electricity from a power source (not shown but e.g. a battery bank) whereby the motor 70 is configured to convert the electrical energy into a kinetic rotation of the input shaft 14. In some embodiments, not shown, a plurality of smaller motors can be engaged to drive the gearbox assembly. Although it is possible to utilise any motor, a brushless motor can be preferred over a DC motor. Using brushless motors can be more energy efficient, can improve the longevity of the motor, and may reduce the cost of maintenance typically expended (as there is no need to replace worn brushes).

The motor 70 rotates, via the output shaft 71 and input shaft 14, the drive gear of the gearbox assembly 50. The arrangement of the gears within the gearbox assembly 50 is flexibly adaptable to suit the needs of the system. For example, the gear arrangement can be used to transmit either a high torque or low torque by configuring the gear assembly with the appropriate gears.

Torque is defined as the turning force when load (N) is applied at a distance (mm) away from the centre of rotation. Torque becomes larger as the distance from the centre of rotation becomes longer even if the load is small. On the other hand, torque becomes larger as load is increased even if the distance from the centre of rotation is short. In other words, torque is the factor determined by the distance from the centre of rotation and load.

Thus, for a given input load, the calculation of torque typically depends on the relative number of teeth between the input gear and the output gear, the number of teeth being representative of the ratio of the radii of the two meshed gears. The torque can be reduced due to mechanical inefficiencies in conventional mechanical gears. For example, by the heat and/or the hammering sound produced by the meshing teeth, each representing the energy lost through the mechanical inefficiency of the gears.

Transmitting the load from a smaller gear to a larger gear increases the torque by a ratio that reflects the increase in radius between the two gears. Likewise, when a load is transmitted from a larger gear to a smaller gear, the torque is decreased by the ratio that reflects the decrease in radius between the two gears. However, when two gears are fixed to rotate on the same shaft, the torque is equal between the gears, regardless of the radii of the two gears. For example, when the drive gear has 18 teeth, and the driven gear has 36 teeth, then a 25 Nm input from the drive gear results in 50 Nm output at the driven gear courtesy of the 2:1 transmission across the meshed gears.

The embodiments of the regenerative gearbox system 100, 100, 100", 100'" shown in FIGS. 1 to 9 illustrate the flexibility and the potential applications of the presently disclosed system.

The gear assembly 50 (FIGS. 1 and 2A) can be highly efficient in regenerating electrical current for replenishing at least a portion of the energy exhausted by the power source. In addition, the same gear assembly 50 can be used to transmit high or low torque, as desired, to the output shaft 34 (FIG. 2A).

Figure 1B:
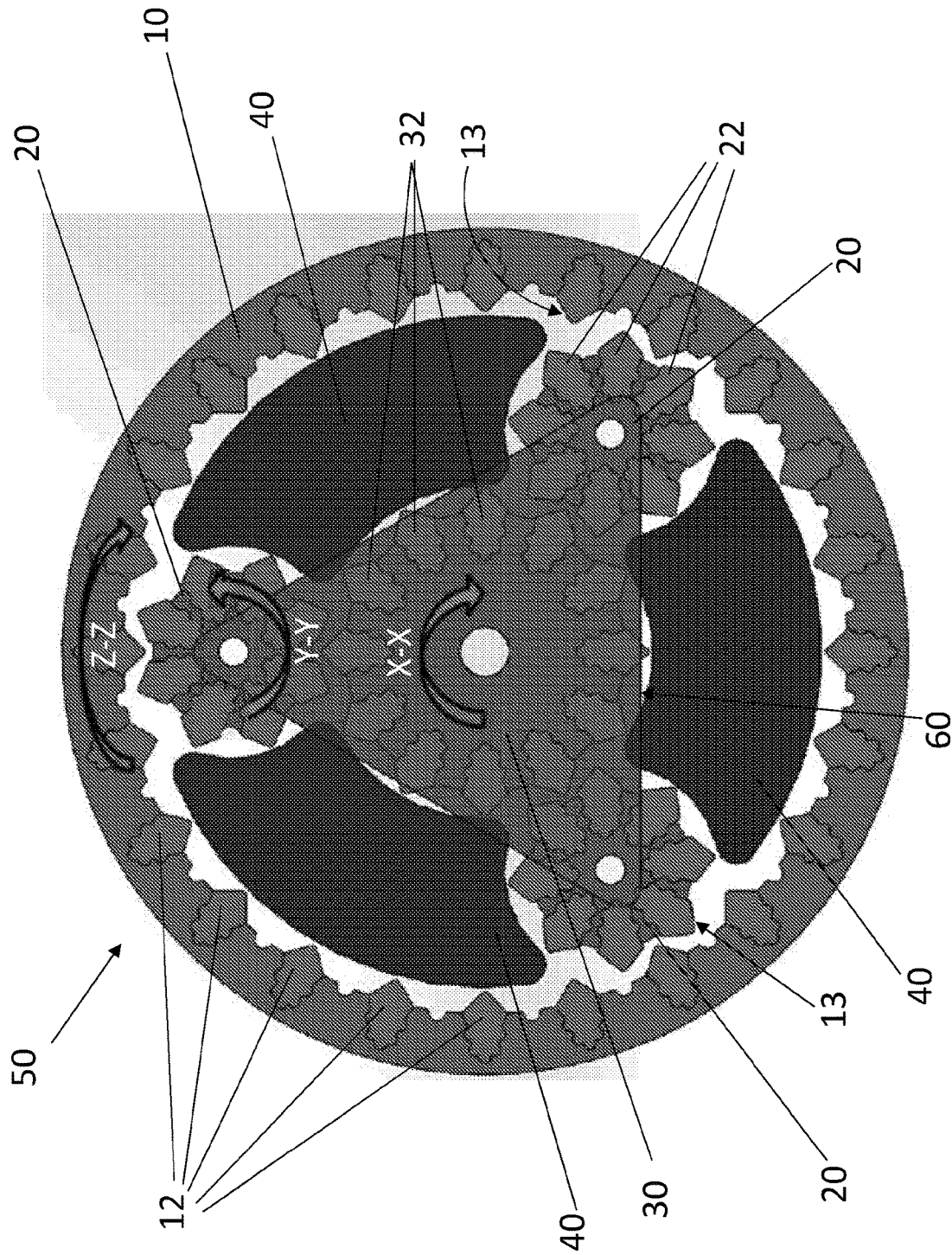
Figure 2A:
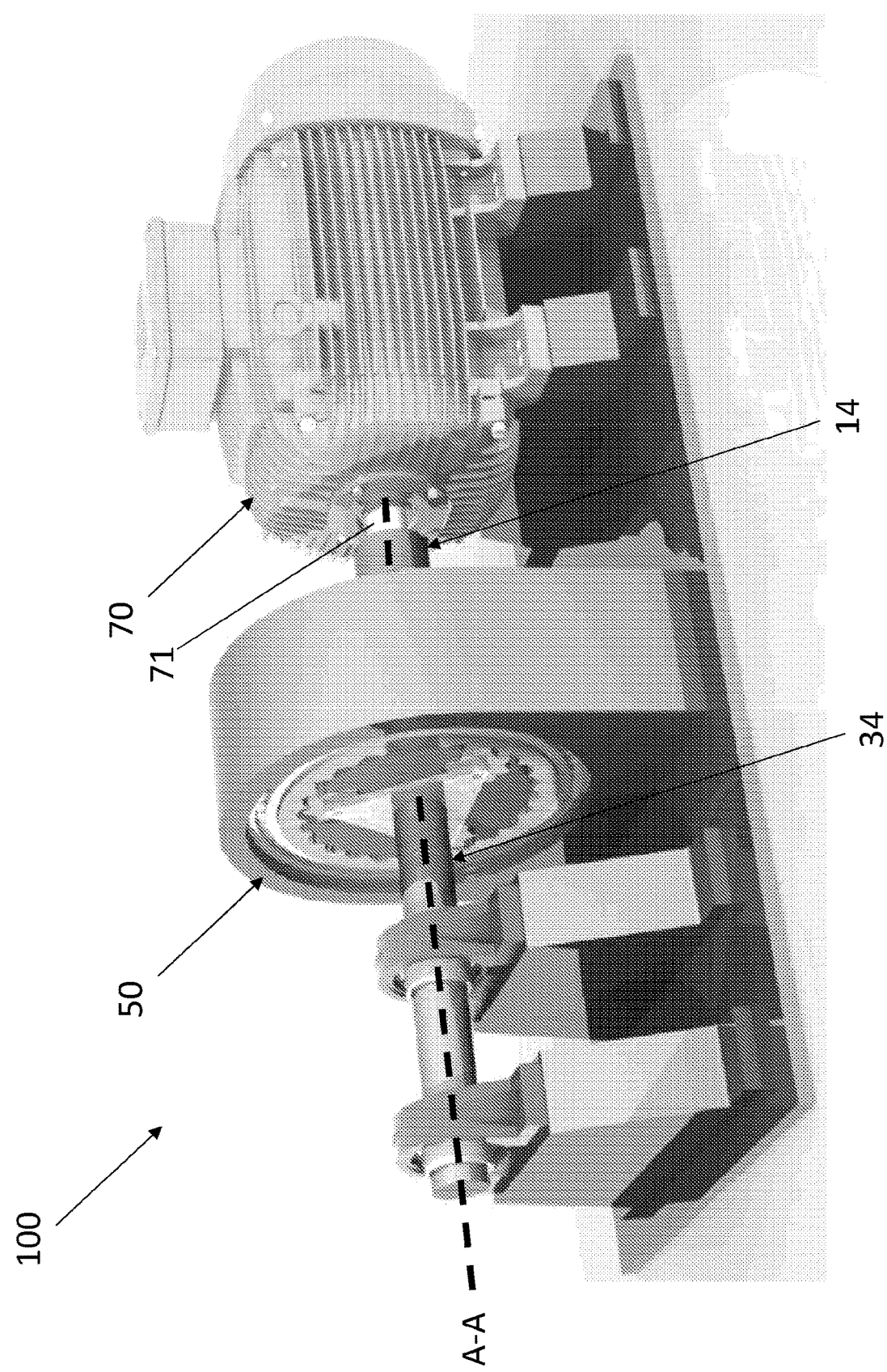
FIGS. 2A, 2B and 2C show alternative perspective views of a regenerative energy system incorporating the first embodiment of the gear assembly.

For example, in some embodiments of the gearbox assembly 50 as illustrated in FIGS. 1 and 2A, the gearbox assembly 50 can be configured for a high torque output. The gearbox assembly 50 generally comprises a planetary setup, with the input shaft 14 rotating the sun gear 30 in the sun direction X-X (FIG. 1B) that corresponds to the driven direction of the input shaft 14. The sun gear 30 is located such that a central axis about which the sun gear 30 rotates is colinear with the central axis A-A of the input shaft 14. In this embodiment, the sun gear 30 acts as the drive gear of the gearbox assembly 50. Three planetary gears 20 are spaced equidistantly in a triangular formation around the sun gear 30 such that the teeth 32 of the sun gear 30 are meshed with the teeth 22 of the planetary gears 20. As set forth above, in usual operation of the gearbox assembly 50, such meshing is a non-contact meshing, as produced by the respective magnetic repulsive forces of the teeth of the gears. However, as set forth above, the configuration of each of the teeth and gears (radially projecting from a gear external or internal periphery) is such that the teeth and gears can, as required, mesh in contact with each other when such respective magnetic repulsive forces of the teeth of the gears are overcome.

The planetary gears 20 are driven by the sun gear 30 so as to rotate in a planetary direction YY (FIG. 1B), the planetary direction YY being opposite to that of the sun direction XX. Each of the three planetary gears 20 can be mounted to rotate on a single member 60, that acts as a cage to captively space the planetary gears 20 around the sun gear 30, and that also assists with aligning the planetary gear teeth 22 so that they engage and mesh with the teeth 32 of the sun gear 30. A ring gear 10 encircles the three planetary gears 20 such that the inwardly facing teeth 12 of the ring gear 10 can be meshed with the teeth 22 of each of the three planetary gears 20 simultaneously. The central axis of the ring gear 10 is colinear and coaxial with that of the sun gear 30 and input shaft central axis A-A. As explained below with reference to the embodiment of FIGS. 8 and 9, the ring gear 10 can act as an output gear for the gearbox assembly 50 (i.e. it can be connected/coupled to the output shaft 34).

The individual axis about which each of the three planetary gears 20 rotates can either be fixed in space relative to the sun gear 30, or can be configured to roll and orbit around the sun gear 30 as the planetary gears 20 are driven to rotate by the sun gear 30. For example, the planetary central axis B-B (FIG. 1A) about which one of the planetary gears 20 is arranged to rotate, lies offset and extends parallel to the input shaft central axis A-A. In use, the planetary central axis B-B can either orbit the input shaft central axis A-A as the respective planetary gear 20 is driven to rotate, or alternatively in some embodiments, the planetary gear axis B-B can be fixed in space relative to the input shaft central axis A-A.

In embodiments where the planetary gears 20 are allowed to orbit the sun gear 30, the ring gear 10 can be fixed to be static so as to prevent rotation of the ring gear 10 itself. Instead the planetary gears 20 rotate and orbit the sun gear 30, with the planetary gear teeth 22 meshing with both the ring gear teeth 12 and the sun gear teeth 32. Instead of the ring gear 10 causing the output shaft 34 to rotate, the combined result of the rotation of the planetary gears is transferred via the single member 60 that joins each of the three planetary gears 20 into the output shaft 34. The output shaft 34 is coaxial with the input shaft 14, and is driven to rotate about the input shaft central axis A-A in the same direction of rotation as the sun direction X-X.

The solenoids 40 comprising the coils would be arranged to rotate with the planetary gears 20 unless these coils were offset from the rotational path of the planetary gears 20.

Figure 2C:
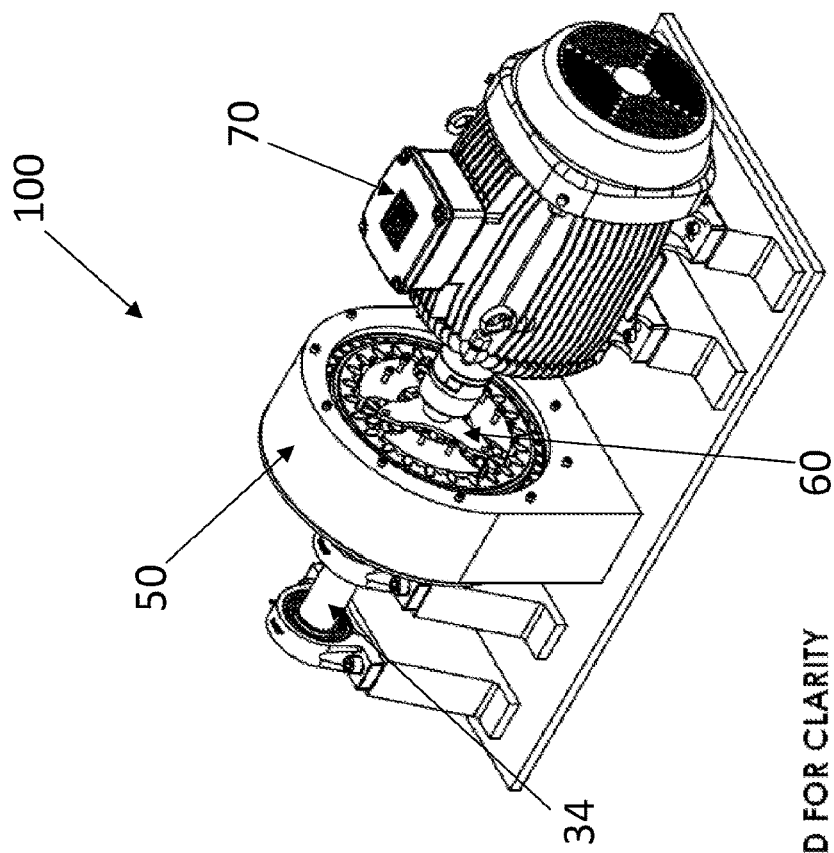
Figure 2B:
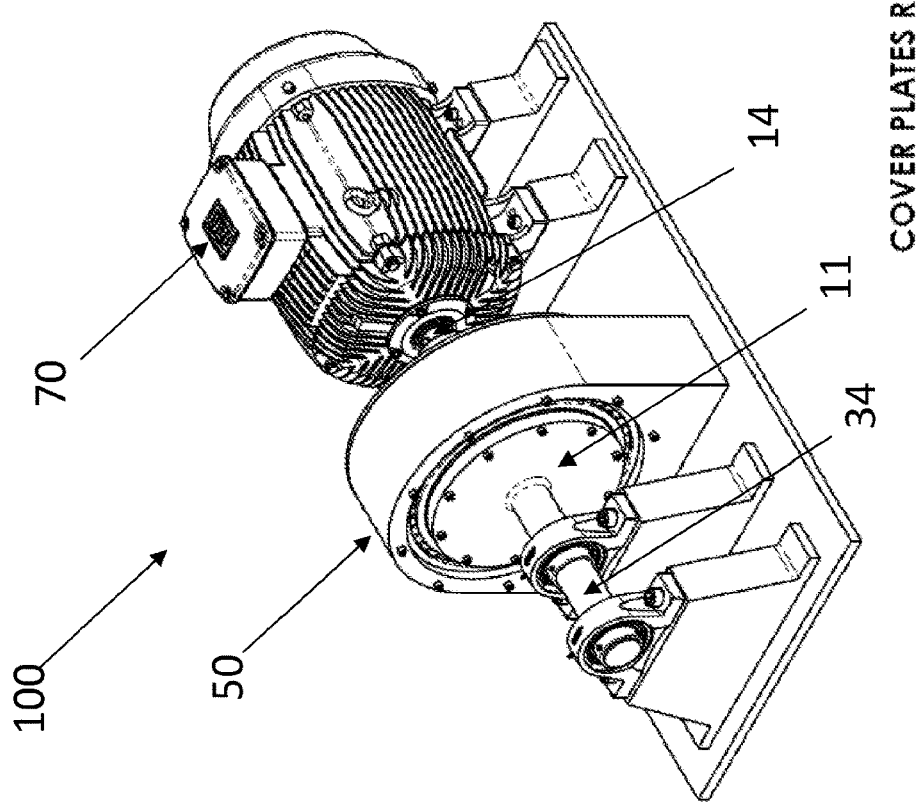

In embodiments where the planetary gears 20 are fixed in space relative to the sun gear 30, each planetary gear 20 is configured to rotate about its respective fixed axis B-B that lies offset and extends parallel to the input shaft axis A-A in a generally equidistant triangular formation. In this case, the planetary axes B-B do not orbit the input shaft axis A-A. Instead, the driven rotation of the planetary gears 20 drives the ring gear 10 to rotate in a ring direction Z-Z (FIG. 1B) about the central axis of the ring gear 10 (i.e. about input shaft axis A-A). The ring direction Z-Z of rotation is opposite to the planetary direction Y-Y (i.e. in the same direction of rotation as the sun direction X-X of the sun gear 30). As shown in FIGS. 2B and 2C, the ring gear 10 can be connected (e.g. via spokes or plate 11) to the output shaft 34, the latter which is driven to rotate by the rotation of the ring gear 10, undergoing a transmission from the sun gear 30 through to the planetary gears 20 and ultimately the ring gear 10 thus generating a high torque output. This is also explained in the embodiment of FIGS. 8 and 9.

In a further alternative embodiment of the gearbox assembly 50 configuration as illustrated in FIGS. 1 and 2A, the gearbox assembly 50 can be configured for a low torque output. This configuration is shown in FIGS. 2B and 2C. In such embodiments, the ring gear 10 can be configured to be engaged by the rotation of the input shaft 14 (e.g. via spokes) so as to act as the drive gear of the gearbox assembly 50. The individual axis about which each of the three planetary gears 20 rotates can either be fixed in space relative to the sun gear 30, or can be configured to roll and orbit around the sun gear 30 as the planetary gears 20 are driven to rotate by the ring gear 10.

In embodiments where the planetary gears 20 are allowed to orbit the sun gear 30, the sun gear 30 can be fixed to be static so as to prevent rotation of the sun gear 30 itself. Instead the planetary gears 20 rotate and orbit the sun gear 30, with the planetary gear teeth 22 being driven by the meshed engagement of the ring gear teeth 12. As the sun gear 30 is static and non-rotary, the combined result of the rotation of the planetary gears is transferred via the single member 60 that joins each of the three planetary gears 20 into the output shaft 34. The output shaft 34 is coaxial with the input shaft 14, and is driven to rotate about the input shaft central axis A-A in the same direction of rotation as the ring direction Z-Z.

In embodiments where the planetary gears 20 are fixed in space relative to the sun gear 30, each planetary gear 20 is configured to rotate about its respective fixed axis B-B that lies offset and extends parallel to the input shaft axis A-A in a generally equidistant triangular formation. That is, the planetary axes B-B do not orbit the input shaft axis A-A. Instead, the driven rotation of the planetary gears 20 by the ring gear 10 drives the sun gear 30 to rotate in the sun direction X-X (that corresponds to the driving ring direction Z-Z) about the central axis of the ring gear 10 (i.e. input shaft axis A-A). The output shaft 34 is thus driven to rotate by the rotation of the sun gear 30, undergoing a transmission from the ring gear 10 through to the planetary gears 20 and ultimately the sun gear 30, thus generating a low torque output.

Each of the gears 10, 20, 30 of the gearbox assembly 50 can comprise one or more permanent magnets. The permanent magnets can be bonded to, or integrally formed with, each respective gear 10, 20, 30. A single permanent magnet can be used, or a plurality of permanent magnets can be spaced around the circumference of each respective gear 10, 20, 30. In some embodiments, the teeth 12, 22, 32 of each gear 10, 20, 30 can themselves comprise the permanent magnets so as to form magnetically assisted mechanical gears (see e.g. FIG. 8D).

As would be understood by one skilled in the art, a north pole of a magnet would normally be attracted towards the south pole of an adjacent magnet. Additionally, a north pole of a magnet would normally be repelled away from the north pole of an adjacent magnet. Thus, when assembling the gears fitted with permanent magnets 10''', 20''' each gear is spaced from an adjacent gear such that the north pole N of a magnetic tooth of a first 10''' of the two gears is offset from the south pole S of the magnetic tooth of a second 20''' of the two gears when the two gears are meshed. In other words, the north pole N and south pole S are radially distanced from one another such that the magnets in opposing magnetic teeth do not repel or attract each other. Instead the magnets cause the opposing magnetic teeth to levitate in mid-air at a relative distance from one another.

However, under extreme operating conditions, when the magnetic field is overloaded, the magnetic teeth can be moved out of the state of levitation so as to touch the magnetic teeth of an adjacent meshed gear, whereby the magnetic teeth 12, 22, 32 of the meshed gears automatically engage like conventional mechanical gears (i.e. by physically touching). As the magnetic teeth 12, 22, 32 of the meshed gears 10, 20, 30 do not touch in use under normal load conditions, magnetically assisted mechanical gears may thus reduce the efficiency losses caused by friction inside the gearbox assembly 50.

Magnetic materials such as neodymium are typically very brittle. Thus, the magnetic core within the teeth 12, 12', 12", 12''' and 22, 22', 22", 22''' of the magnetically assisted mechanical gears 10, 10', 10", 10''' and 20, 20', 20", 20''' can be protected using a coating 13, 13', 13", 13''' of a suitable material for mechanical gearing. Such a material for example may be silicone rubber with a high Shore rigidity, around 90 for example. Not only is silicone rubber chemically inert, but it can be manufactured to have a low friction coefficient and can withstand temperatures from 100° C. below to 100° C. heat. Other materials like POM plastic (Delrin™) or metals with low electromagnetic permeability such as aluminium, stainless steel etc. may be used as well. Mechanical gears have a distinct surface, with a pressure curve for the gears, etc. The coating on the magnets can be shaped to correspond to the shape of the mechanical gears. Thus, when the magnetically assisted mechanical gears are in an overloaded state, and the repulsive magnetic forces are overcome, the gears are able to perform as a conventional mechanical gear when the gears touch.

One or more coils 41 in each solenoid 40 used for generation of the electrical current can be at least partially located within in the vacant space within the circular hollow section of the ring gear 10 between the inwardly facing teeth 12 of the ring gear 10, the teeth 22 of the planetary pinion gears 20, and the teeth 32 of the sun gear 30 (e.g. FIGS. 1A, 1B, 2A, 2B and 2C). Alternatively, a solenoid 40 can be located in proximity to one or more of the gears 10, 20, 30 of the gearbox assembly 50, the proximity being defined by the strength of the magnetic field generated by the permanent magnets used in the regenerative gearbox system 100. Electrical current can be generated within the coil(s) of the solenoid 40 by the relative rotational movement of the permanent magnets when the gears 10, 20, 30 rotate.

In some embodiments, the solenoid 40 can be configured to orbit the sun gear 30 along with the orbit of the planetary gears 20. In such an embodiment, the solenoids 40 can be attached to the cage-like single member 60 so as to rotate as a unitary body with the single member 60 and planetary gears 20. Although both the planetary gears 20 and solenoids 40 are moving, the planetary gears 20 would also spin in a relative rotational movement proximal to the non-rotational coils 40. Thus, the permanent magnets of each of the gears 10, 20, 30 experience a rotational movement relative to the solenoid 40, and thus each of the gears 10, 20, 30 is able to contribute to the generation of an electrical current in the coils 41 of solenoid 40.

In some embodiments, the solenoid 40 can be configured to be fixed in relative space, so as to be statically located in proximity to one or more of the gears 10, 20, 30 of the gearbox assembly 50. For example, when the planetary gears 20 are configured to not orbit the sun gear 30 (e.g. in one embodiment of the arrangement of FIGS. 1A and 1B), the solenoid 40 can be secured so as to be substantially contained within the profile of the circular hollow section of the ring gear 10 and within the gaps between the various gears 10, 20, 30. The permanent magnets of each of the gears 10, 20, 30 experiences a rotational movement relative to the stationary solenoids 40. As above, each of the gears 10, 20, 30 is thus able to contribute to the generation of an electrical current in the coils 41 of each solenoid 40.

The solenoid 40 harvests the electrical current generated by the rotational movement of the permanent magnets when the gears 10, 20, 30 rotate. The coils 41 in each solenoid 40 then acts as a conductor to transfer the generated electrical energy into the power source (e.g. a battery) for storage. In use, the regenerative energy system is thus advantageously able to generate electrical current to recharge the power source simultaneously whilst the power source is delivering power to the motor to drive the gears.

For example, even in embodiments where the gear teeth are not magnetic themselves, i.e. for a mechanical gearbox, it is possible to have permanent magnets affixed to one or more of the mechanical gears. For example, the magnets can be positioned distal to or inbound of the teeth (e.g. on gear spokes or adjacent the teeth, etc.) to generate a magnetic field that will interact with the one or more coils of wire to produce electromagnetic induction. The repetitive change in the magnetic field experienced by the coils as they move through the magnetic field induces a Voltage or EMF (Electromotive Force).

Thus, in use, the disclosed regenerative gearbox system 100 can continuously harvest the electric current from the coils 41 in each solenoid 40 regardless of whether the gears 10, 20, 30 are formed with teeth 12, 22, 32 that are magnetised or conventional non-magnetised mechanical gear teeth. The regenerative gearbox system 100 can simultaneously draw electrical energy to drive the gearbox assembly 50 whilst also returning the electrical energy that is generated within the coils 41 of each solenoid 40 to the power source. Furthermore, even in embodiments where the teeth 12, 22, 32 are each formed to comprise a permanent magnet, the regenerative gearbox system 100 can harvest the electric current from the coils 41 in each solenoid 40 regardless of whether the gear assembly 50 is being operated under normal conditions (i.e. magnetically assisted and frictionless) or in overloaded conditions (i.e. as a conventional mechanical gear).

However, the gearbox assembly 50 may experience substantially smaller mechanical losses (e.g. friction, heat and acoustic) when the gears 10, 20, 30 are formed with teeth 12, 22, 32 that are magnetised. The regenerative gearbox system 100 may thus be highly energy efficient.

The generation of energy is related to the rotational speed of the gears. Further, the magnitude of power generation can depend on how many teeth are arranged on the gear. In some embodiments, where the gear teeth are not magnetised (e.g. the magnets are affixed on the gear in a position distal to or inbound of the teeth) more magnets can be affixed on the gear than the number of gear teeth. In this way, power generation can be disassociated with the arrangement of gear teeth.

Figure 3A:
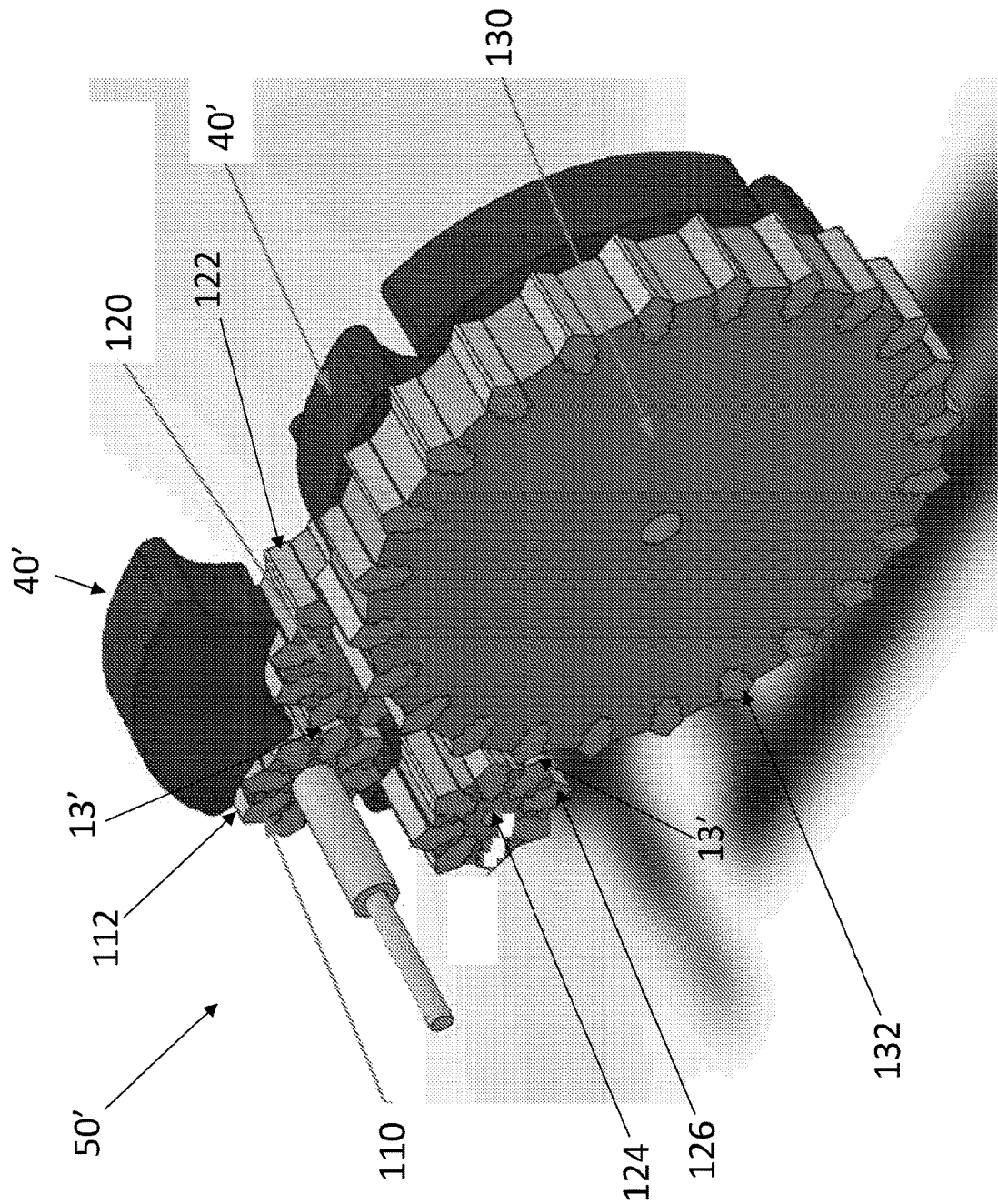
FIGS. 3A, 3B, 3C and 3D shows perspective, front, back and top views of a second embodiment of the gear assembly of a regenerative energy system, respectively.
Figure 3B:
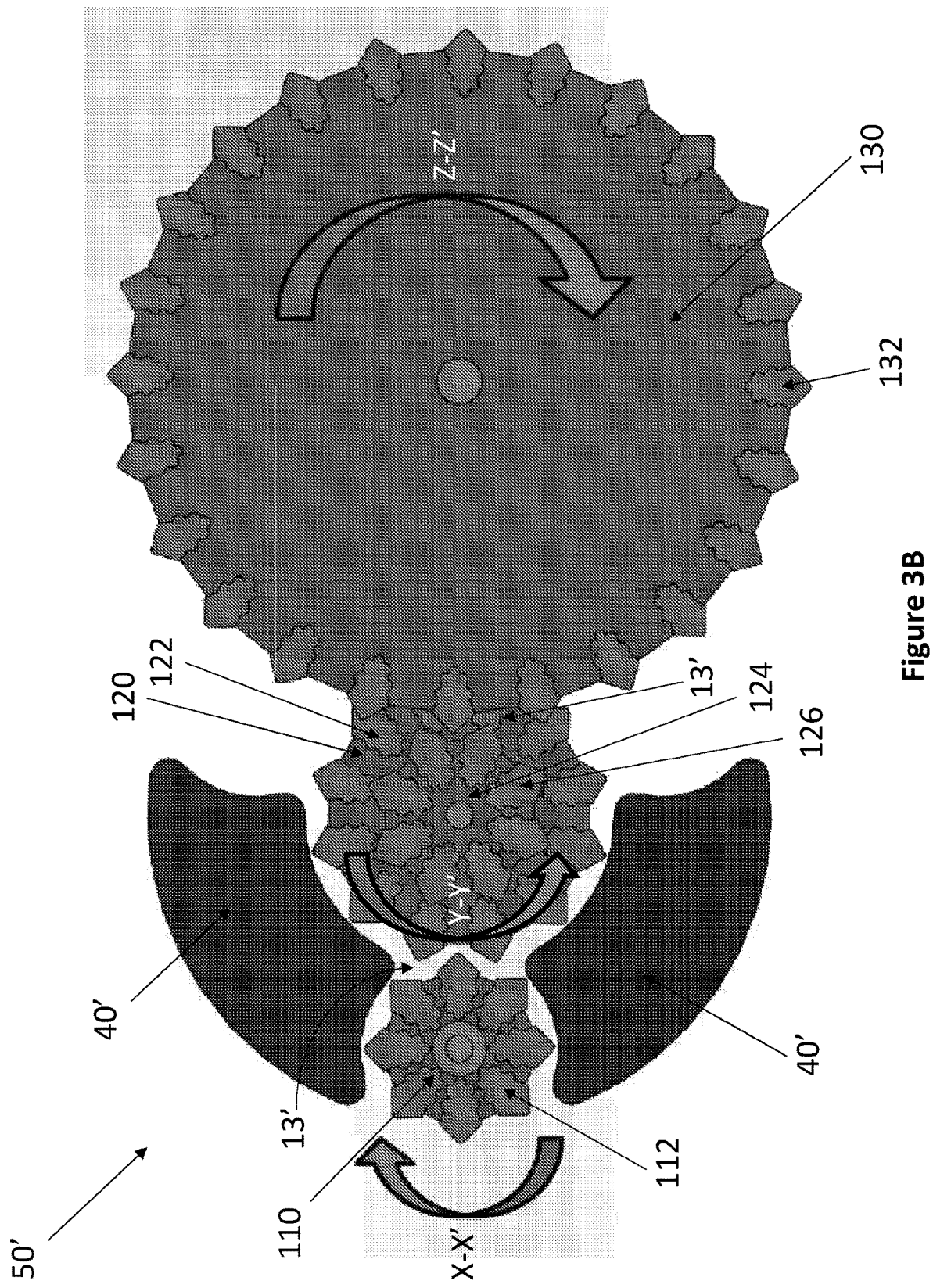
Figure 3C:
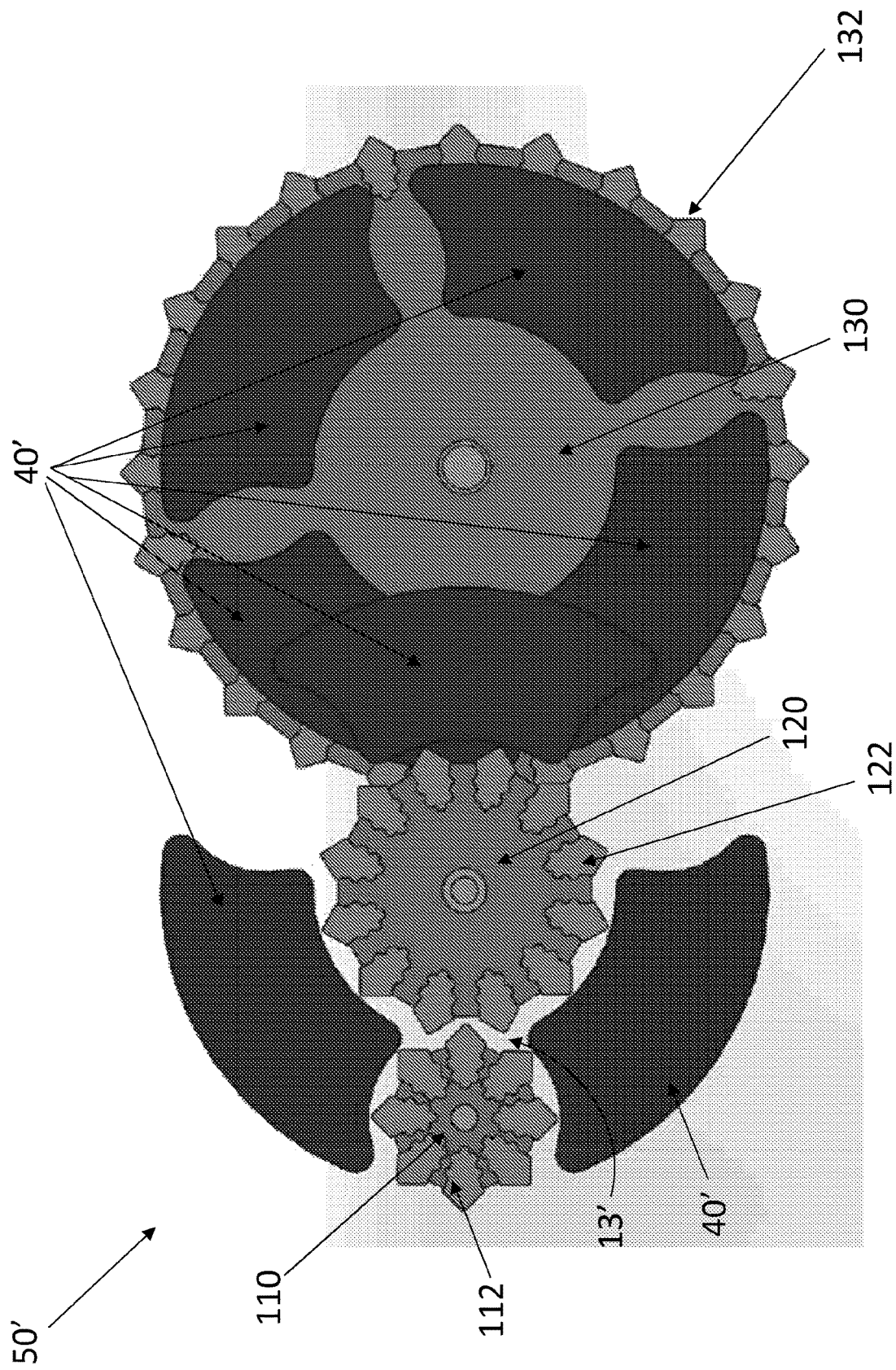
Figure 3D:
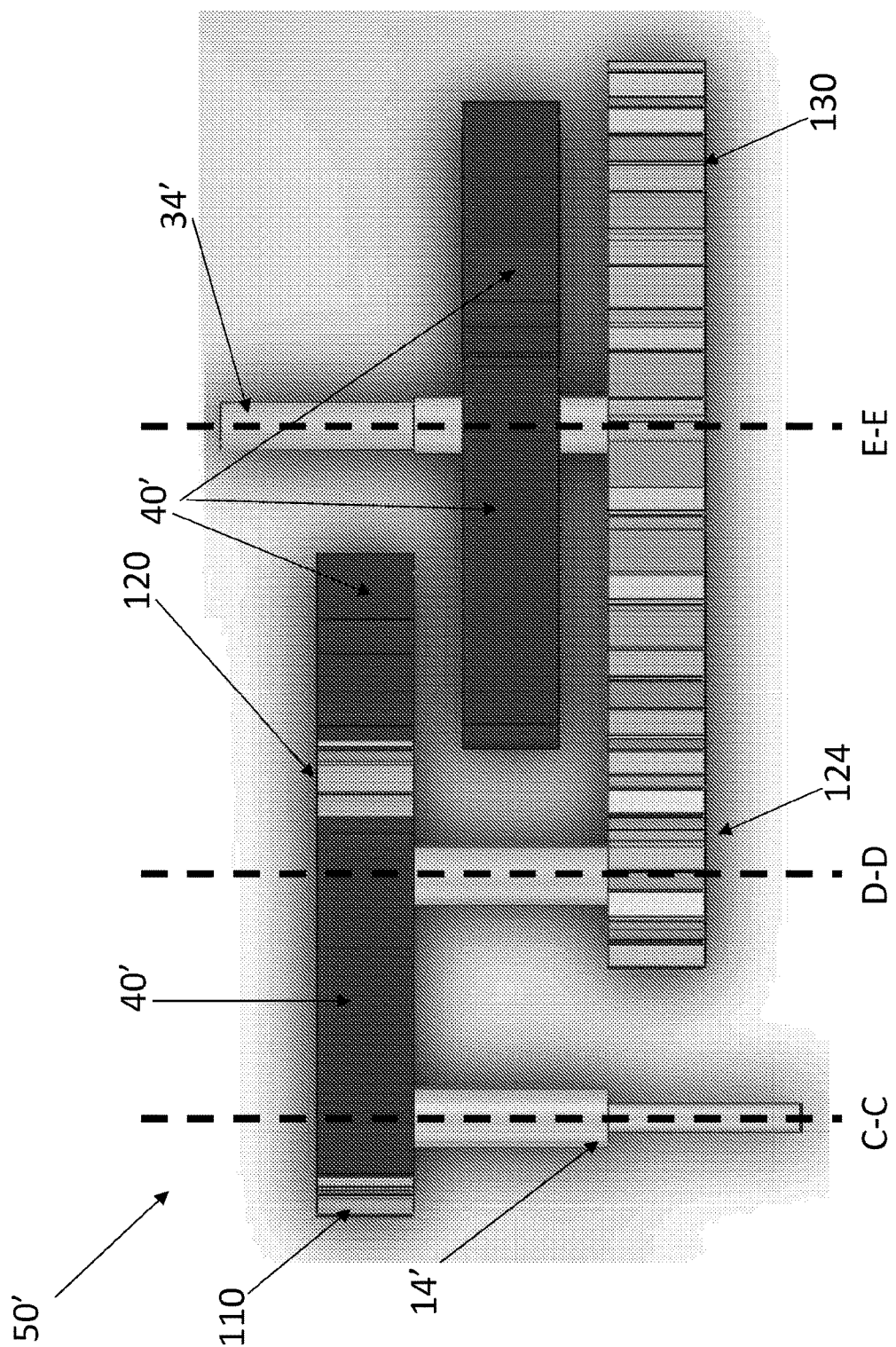
Figure 4A:
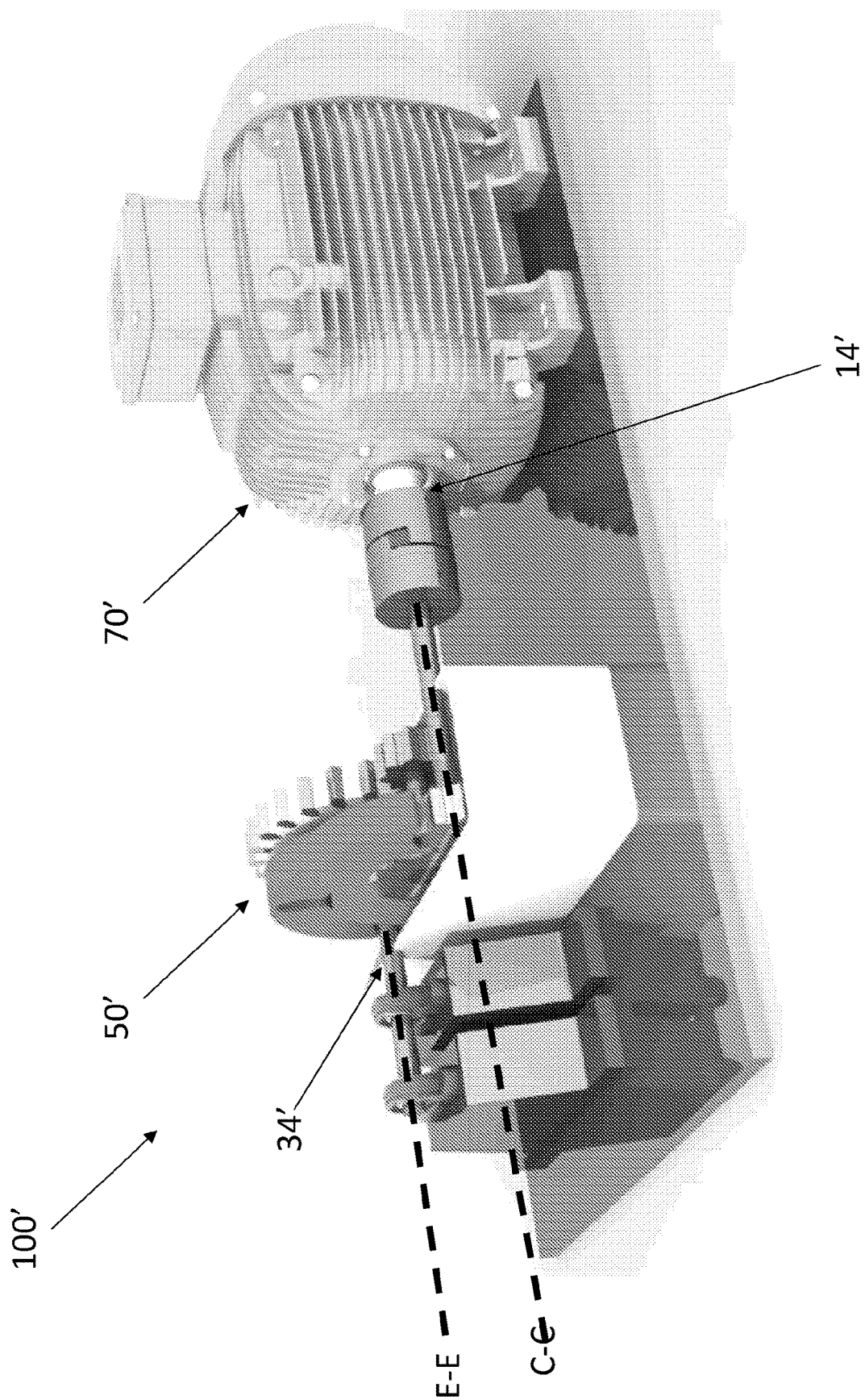
FIGS. 4A, 4B and 4C show alternative perspective views of a regenerative energy system incorporating the second embodiment of the gear assembly.
Figures 4B, 4C:
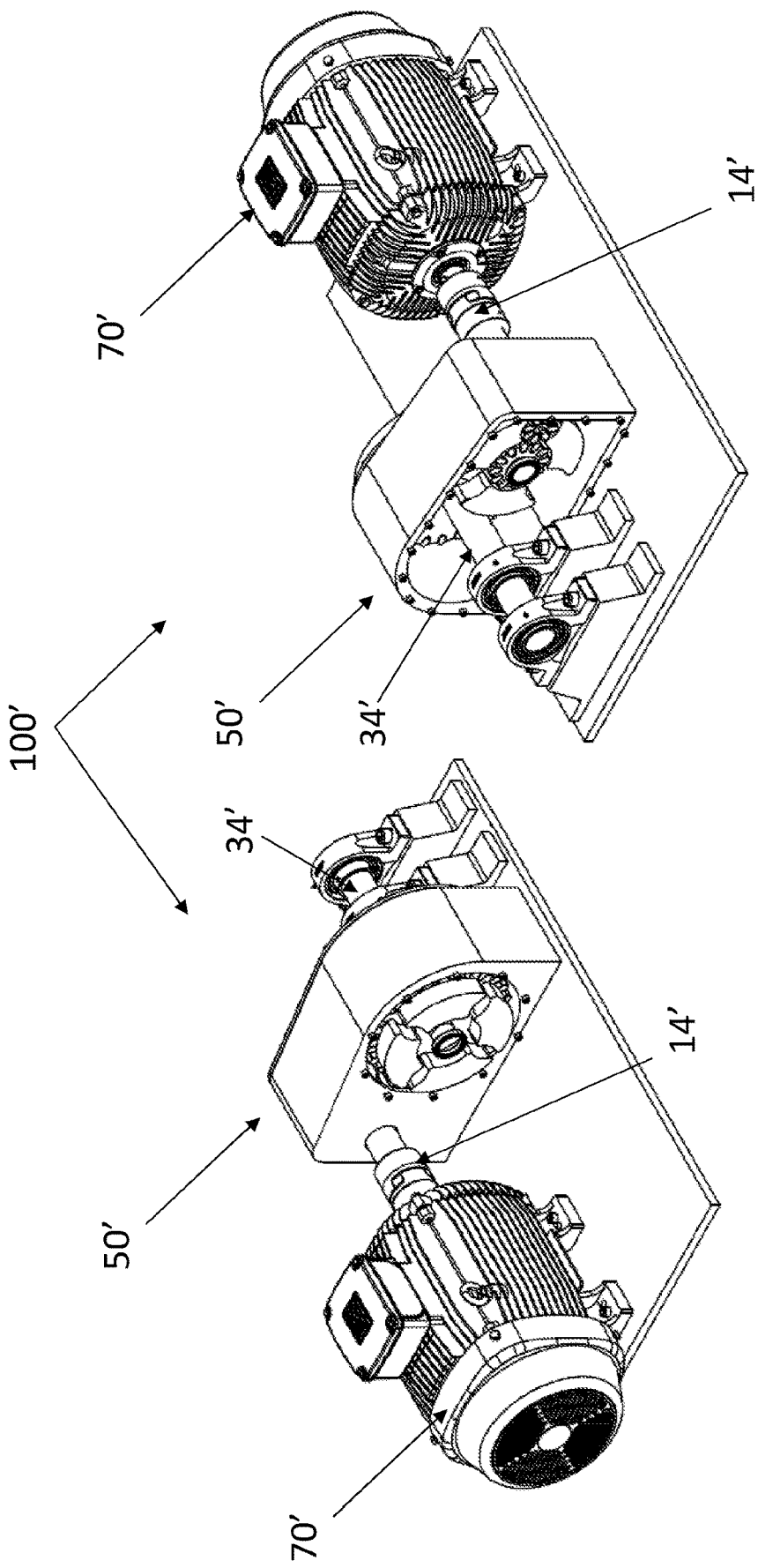

In an alternative arrangement of the regenerative gearbox system 100', the gearbox assembly 50' can be arranged in a substantially conventional step-up gear box arrangement that produces high torque (e.g. FIGS. 3 and 4). A power source, not shown, operates the motor 70' (FIGS. 4A, 4B and 4C) in order to drive the rotation of the input shaft 14'. The input shaft 14' is configured to engage the center of the input pinion gear 110, whereby both the input shaft 14' and the input pinion gear 110 rotate in an input direction X-X' (FIG. 3B) about the shared central input axis C-C (FIG. 3D).

The input pinion gear 110 acts as the drive gear, and the teeth 112 of the input pinion gear 110 are meshed with the teeth 122 of an adjacently located first intermediate gear 120. The first intermediate gear 120 is thus driven to rotate by a rotation of the input pinion gear 110. The first intermediate gear 120 is fixed to the same shaft as the second intermediate gear 124. The first and second intermediate gears 120, 124 therefore rotate at the same speed of rotation and about the same centrally aligned intermediate axis D-D (FIG. 3D) in an intermediate direction Y-Y' (FIG. 3B). The intermediate direction Y-Y' is the opposite rotational direction to that of the input direction X-X'.

In order to enhance the step-up gear box arrangement to produce a high torque, the radius of the first intermediate gear 120 can be larger than that of the second intermediate gear 124. The teeth 126 of the second intermediate gear 124 are able to mesh with the teeth 132 of an adjacently located main gear 130, the main gear 130 being engaged with the output shaft 34' whereby both the output shaft 34' and the main gear 130 rotate in an output direction Z-Z' (FIG. 3B) about the shared central output axis E-E (FIG. 3D). The output direction Z-Z' of rotation is opposite to the intermediate direction Y-Y' (i.e. in the same direction of rotation as the input direction X-X'). The output shaft 34' is thus driven to rotate by the rotation of the main gear 130, undergoing a transmission from the input pinion gear 110 up to the first intermediate gear 120, which translates across to the second intermediate gear 124 and ultimately up again to the main gear 130, thus generating a high torque output. In an alternative embodiment, the gearbox assembly 50' can be arranged in the reverse sequence so as to produce a low torque. The input 14' and output 34' shafts can be aligned on the same horizontal plane, whilst being spaced laterally apart from one another across the horizontal plane.

Each of the gears 110, 120, 124, 130 of the gearbox assembly 50' can comprise one or more permanent magnets. The permanent magnets can be bonded to, or integrally formed with, each respective gear 110, 120, 124, 130. A single permanent magnet can be used, or a plurality of permanent magnets can be spaced around the circumference of each respective gear 110, 120, 124, 130. In some embodiments, the teeth 112, 122, 126, 132 of each gear 110, 120, 124, 130 can themselves comprise permanent magnets so as to form magnetically assisted mechanical gears.

One or more solenoids 40' used for generation of the electrical current can be statically located above, below, or to the lateral side of each of the gears 110, 120, 124, 130 in close proximity to one or more of the gears 110, 120, 124, 130 of the gearbox assembly 50'. Close proximity is defined by the strength of the magnetic field generated by the permanent magnets used in the regenerative gearbox system 100, whereby the proximity is sufficient to enable electrical current to be generated within the coils 41 of each solenoid 40' by the relative rotational movement of the permanent magnets when the gears 110, 120, 124, 130 rotate.

Figure 5A:
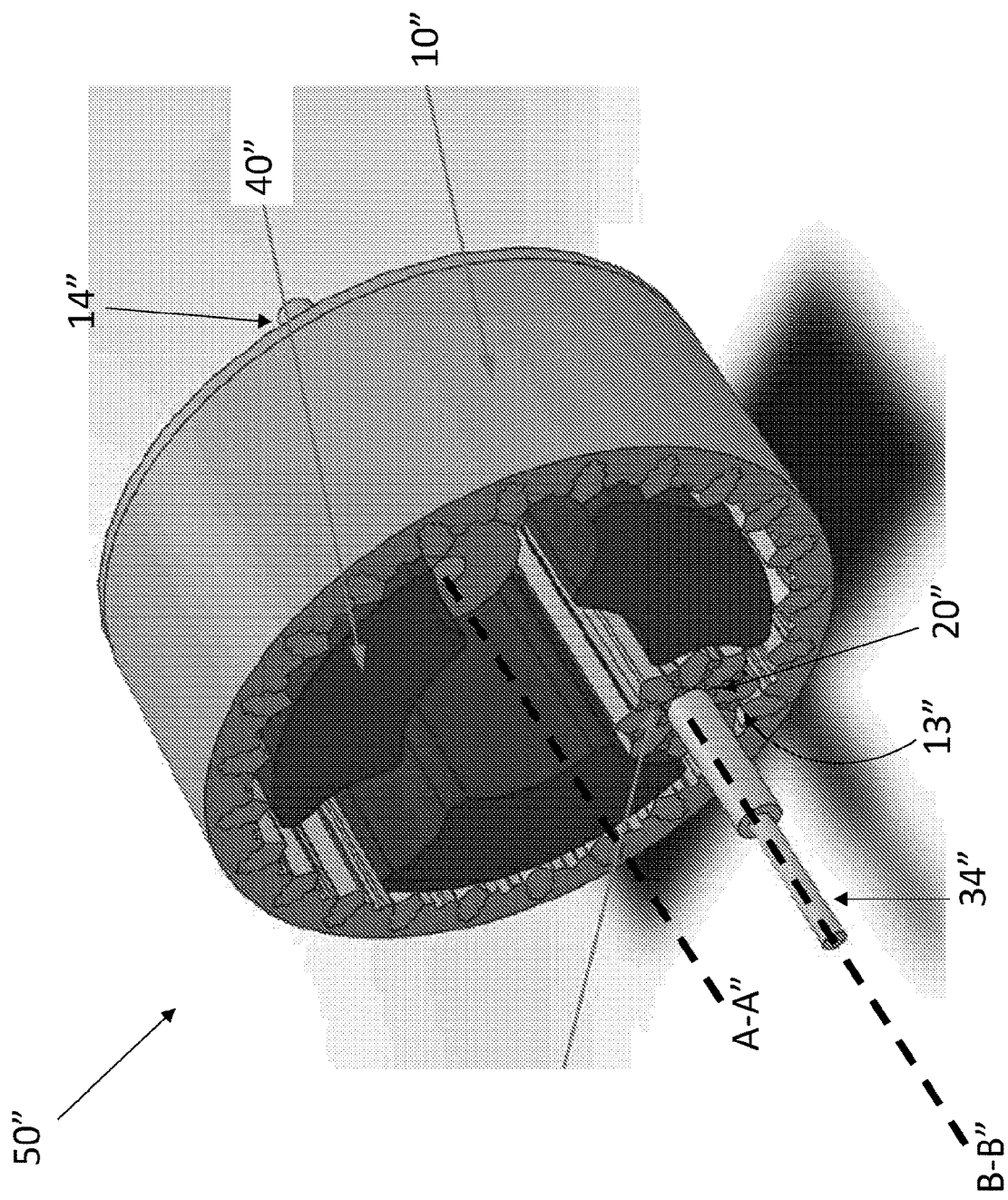
FIGS. 5A and 5B shows perspective and front views of a third embodiment of the gear assembly of a regenerative energy system, respectively.
Figure 5B:
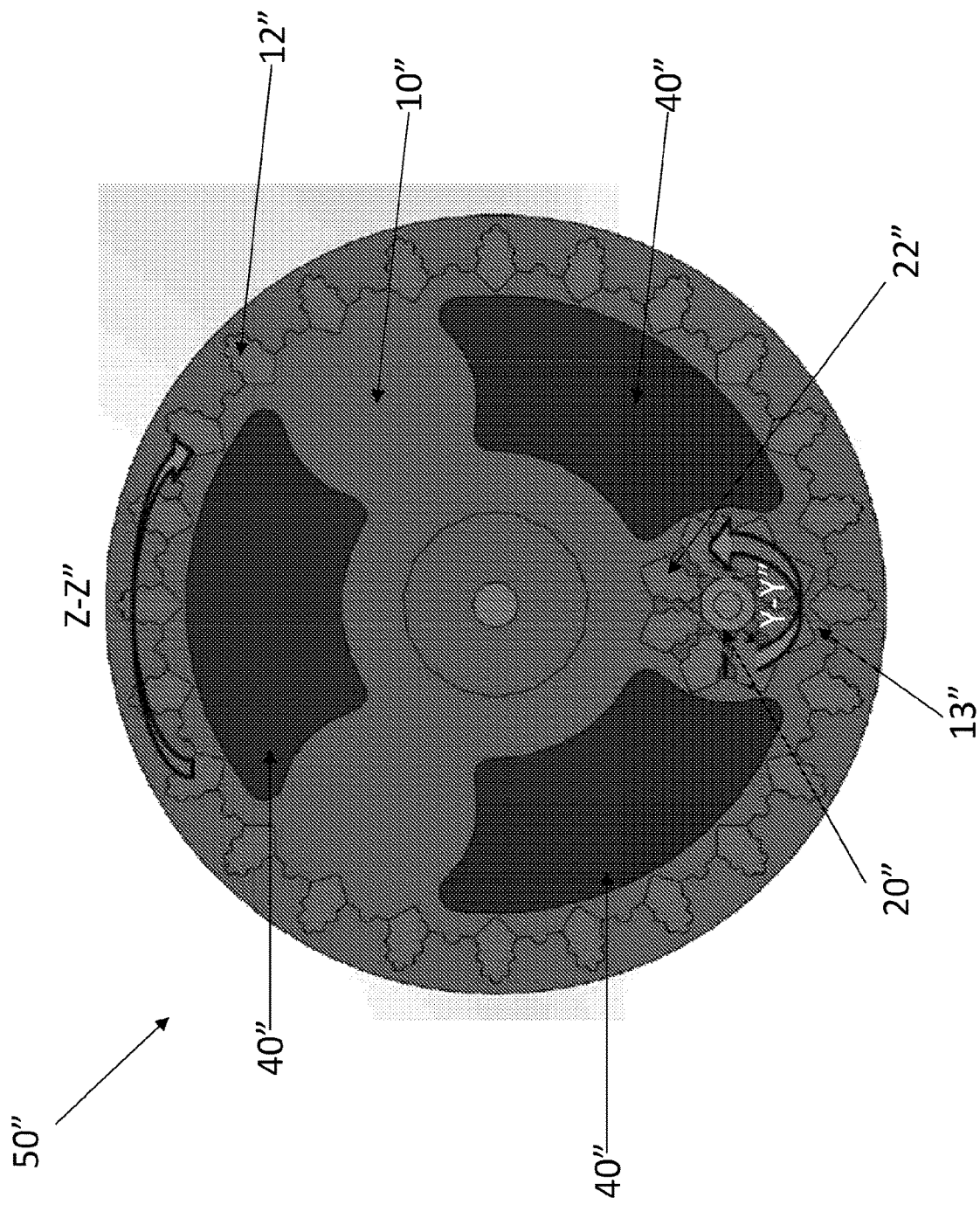
Figure 6:
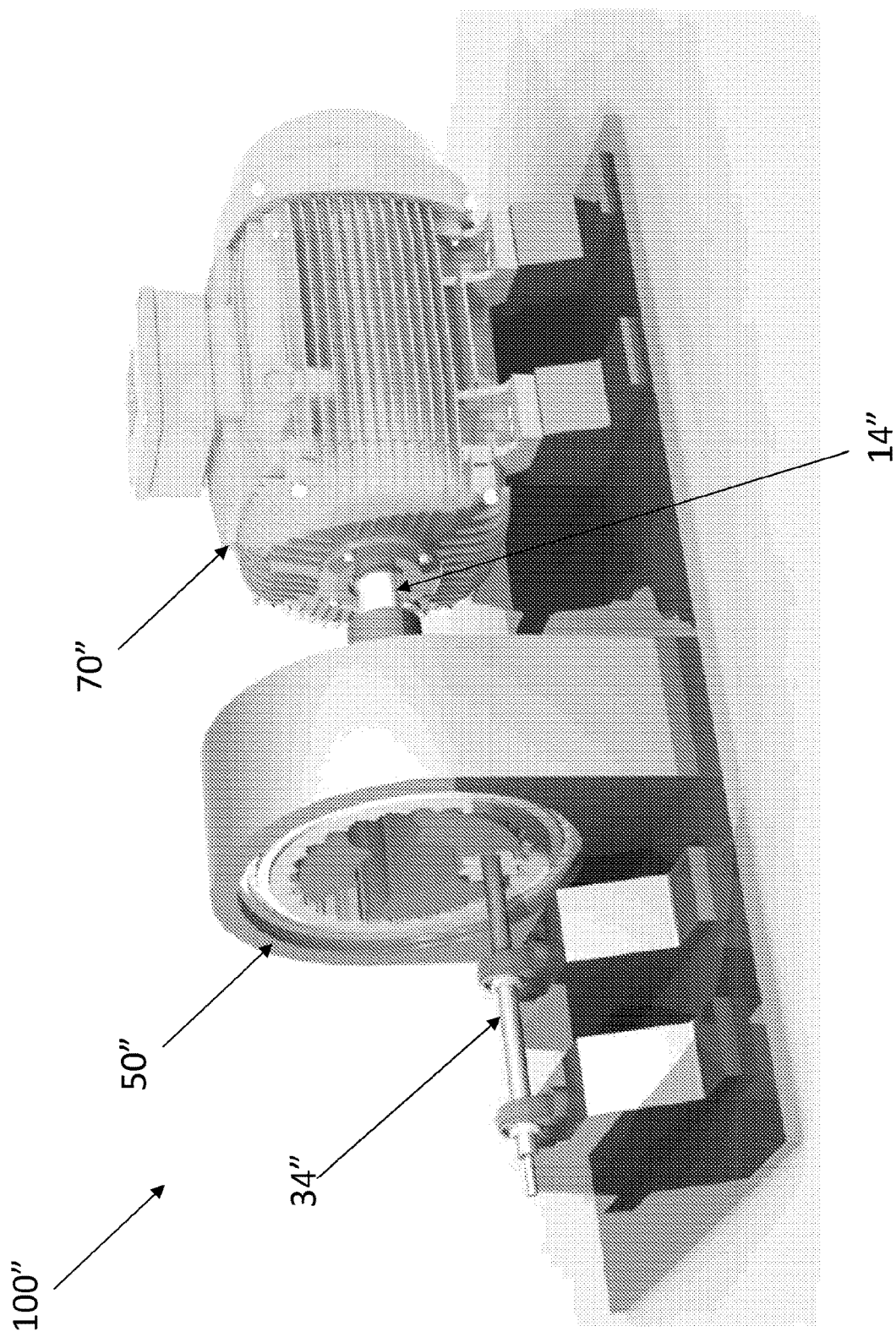
FIGS. 6 and 7 show alternative perspective views of a regenerative energy system incorporating the third and fourth embodiments of the gear assembly.
Figure 7:
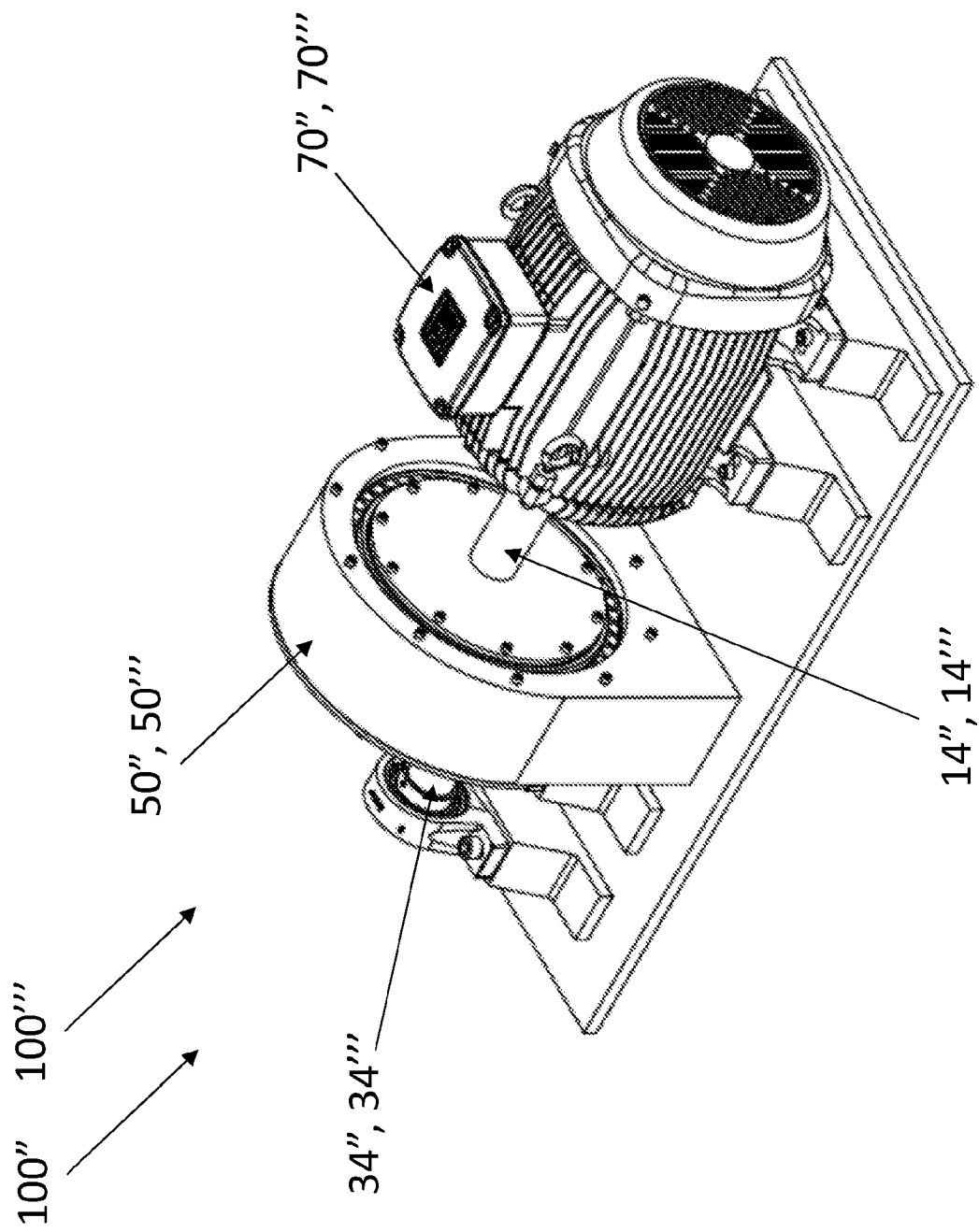

Referring now to FIGS. 5 to 7, in a further alternative arrangement of the regenerative gearbox system 100", the input 14" and output 34" shafts of the gearbox assembly 50" can be arranged to be aligned on the same vertical plane, whilst being spaced from one another along the vertical plane (i.e. at different heights). In some configurations, the gearbox assembly 50" can be arranged to produce a low torque (e.g. FIGS. 5 to 7).

A power source, not shown, operates the motor 70" (FIGS. 6 & 7) in order to drive the rotation of the input shaft 14". The input shaft 14" is configured to engage the center of a ring gear 10", whereby both the input shaft 14" and the ring gear 10" rotate in an input direction Z-Z" (FIG. 5B) about a coaxial central input axis A-A" (FIG. 5A). A planetary gear 20" is disposed within the profile of the circular hollow section of the ring gear 10''', the central axis about which the planetary gear rotates B-B" (FIG. 5A) being aligned on the same vertical plane as the input axis A-A", whilst being spaced below the input axis A-A" along the vertical plane such that the planetary gear teeth 22" engage and mesh with the inwardly facing teeth 12" of the ring gear". The planetary gear 20" is fixed in space relative to the ring gear 10" such that the planetary axis B-B" does not orbit the input axis A-A". The planetary gear 20" is driven by the ring gear 10" so as to rotate in a planetary direction Y-Y" (FIG. 5B), the planetary direction Y-Y" being opposite to that of the sun direction Z-Z". The planetary gear 20" is configured to engage and drive the rotation of the output shaft 34". The output shaft 34" is aligned to be coaxial with the planetary axis B-B". The gearbox assembly 50" thus undergoes a transmission from the ring gear 10" through to the planetary gear 20" thus generating a low torque output. In some configurations, the gearbox assembly 50" can be arranged in a reverse sequence so as to produce a high torque output (not shown).

Each of the gears 10", 20" of the gearbox assembly 50" can comprise one or more permanent magnets. The permanent magnets can be bonded to, or integrally formed with, each respective gear 10", 20". A single permanent magnet can be used, or a plurality of permanent magnets can be spaced around the circumference of each respective gear 10", 20". In some embodiments, the teeth 12", 22" of each gear 10", 20" can themselves comprise permanent magnets so as to form magnetically assisted mechanical gears.

One or more solenoids 40" used for generation of the electrical current can be statically located at least partially located within in the vacant space within the circular hollow section of the ring gear 10" between the inwardly facing teeth 12" of the ring gear 10" and the teeth 22" of the planetary gear 20". Alternatively, a solenoid 40" can be located in proximity to one or more of the gears 10", 20" of the gearbox assembly 50", the proximity being defined by the strength of the magnetic field generated by the permanent magnets used in the regenerative gearbox system 100". Electrical current can be generated within the coils 41 in each solenoid 40" by the relative rotational movement of the permanent magnets when the gears 10", 20" are driven to rotate.

In a fourth embodiment, the regenerative gearbox system 100''' comprises a gear box assembly 50''' that consists of ring gear 10''', planetary gears 20''', sun gear 30''' with solenoids 40''' interposed between the gears. The configuration of the gear assembly is generally the same as the first embodiment shown in FIGS. 1A, 1B. However, the profile of a mounting portion (i.e. 15''', 23''', 33''') of each gear housing/plate where the teeth engage therewith is simplified. In the embodiment of FIGS. 1A, 1B, the mounting portion of each gear housing/plate is profiled with five curved sections, whereas in the housing/plate embodiments of FIGS. 8A, 8B and 8C, the mounting portion of comprises three curved sections, allowing for ease of manufacture as well as ease of fixing This arrangement can be seen more clearly in each of FIG. 8A (planetary gear housing), FIG. 8B (sun gear housing) and FIG. 8C (ring gear housing), which respectively show the profile of the mounting portions 15''', 23''', 33''' for receipt therein of the corresponding, complementary shaped portion 17 of the teeth 12''', 22''', 32''' (FIG. 8D), whereby each of the gear housings/plates engages and retains the gear teeth therein. FIG. 9E shows respective radially projecting gear teeth 12''', 22''' and 32''' with their respective portions 17 located and retained in the mounting portions 15''', 23''', 33'''.

Further, the profile of the mounting portions 15''', 23''', 33''' is the same on all the gears in the fourth embodiment (i.e. the planetary gear 20''', the sun gear 30''' and the ring gear 10''').

Figure 9A:
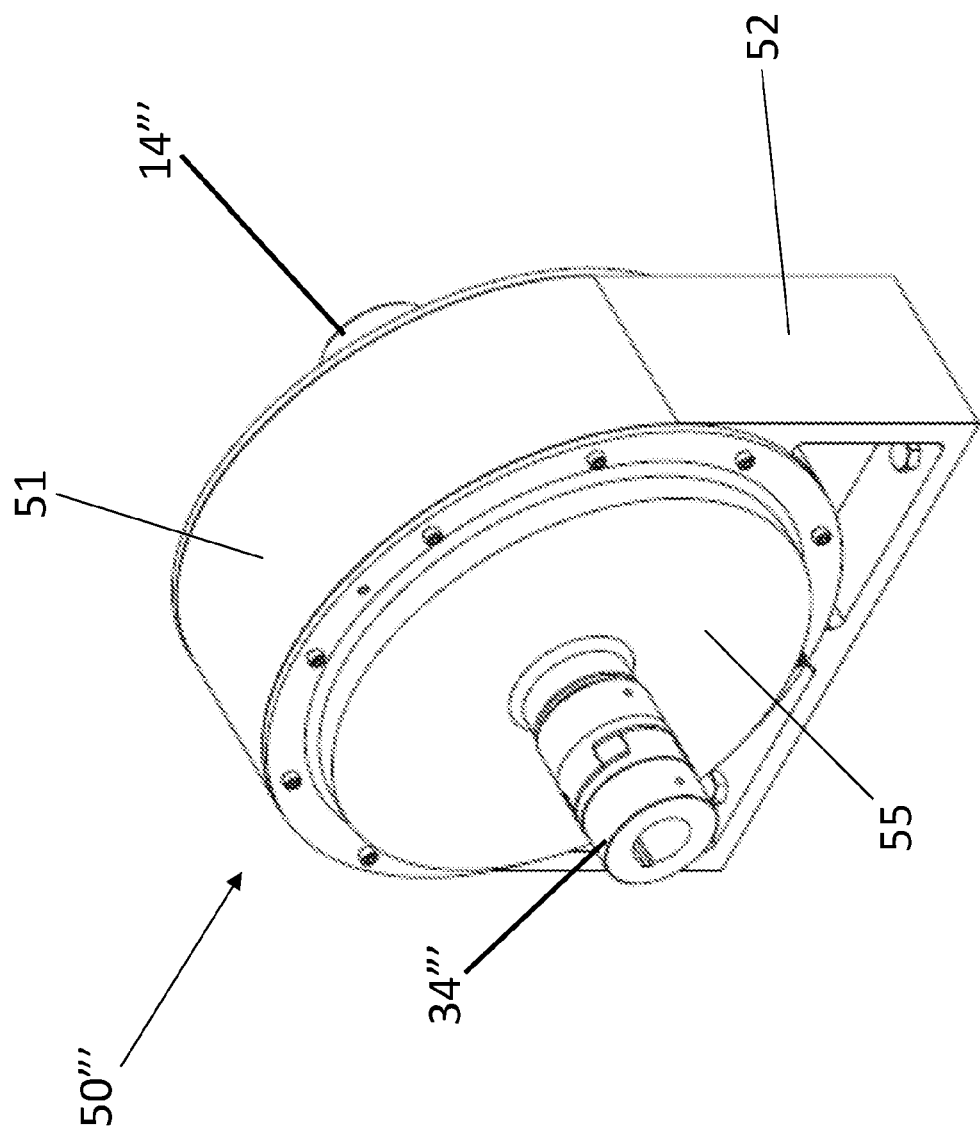
FIGS. 9A, 9B and 9D respectively show perspective, front and plan views of a gearbox incorporating the fourth embodiment of the gear assembly.
Figure 9C:
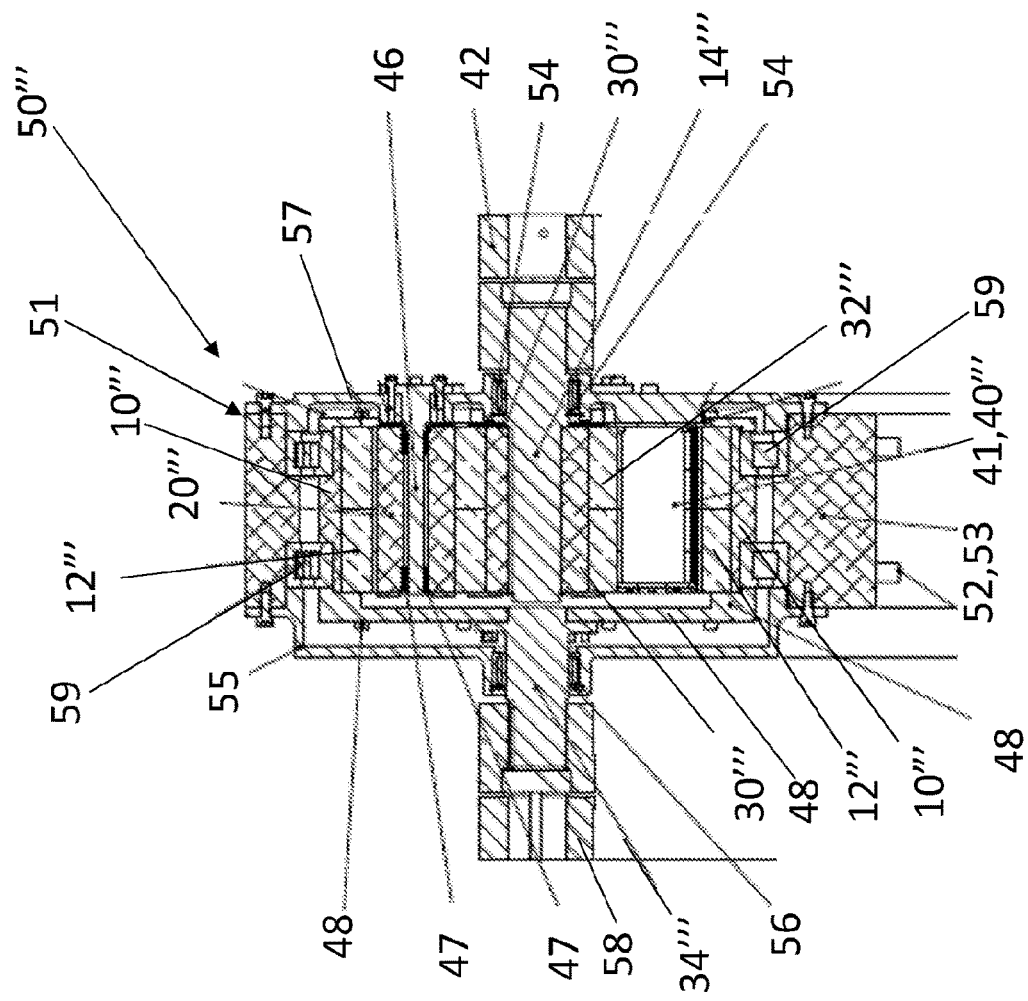
FIG. 9C shows a cross-sectional side view of the gearbox of FIGS. 9A, 9B and 9D taken on the line A-A of FIG. 9B.

Each gear tooth 12''', 22''' and 32''' is an elongate solid element that, when mounted, extends along an axis that is parallel to the axis of rotation of the various gears (see also FIG. 9C). As described above, each tooth can also comprise magnets embedded or incorporated therewithin.

The location and configuration of the coils 41 in the solenoids 40''' are shown in greater detail in FIGS. 9C and 9E than in previous embodiments. Each solenoid 40''' comprises a pair of adjacent coils 41. In the present embodiment, there are three solenoids 40''' located within in the resultant space defined between the inwardly, radially projecting teeth 12''' of the ring gear 10''', the outwardly, radially projecting teeth 22''' of the planetary gears 20''', and the outwardly, radially projecting teeth 32''' of the sun gear 30''' (see the radii as illustrated in each of FIGS. 8A to 8C). This configuration utilizes the space between the gears to a maximum extent but also exposes each solenoid to the magnets of the teeth or each of the ring, planetary and sun gears. The increased number of coils within the volumetric space available increases the output of current thereby resulting in improved performance of the system. Each pair of coils also have two contacts 38 (four in total) in place that allow the current generated in the coils to be transmitted out of the system.

As shown by FIG. 9C, the coils 41 within the solenoids 40''' and the different gears (10''', 20''' and 30''') extend in the direction of the axis of rotation to approximately the same extent. This allows the coils to intercept the magnetic fields generated by the moving magnetic gear teeth fully thus allowing maximum possible output of current.

Figure 9B:
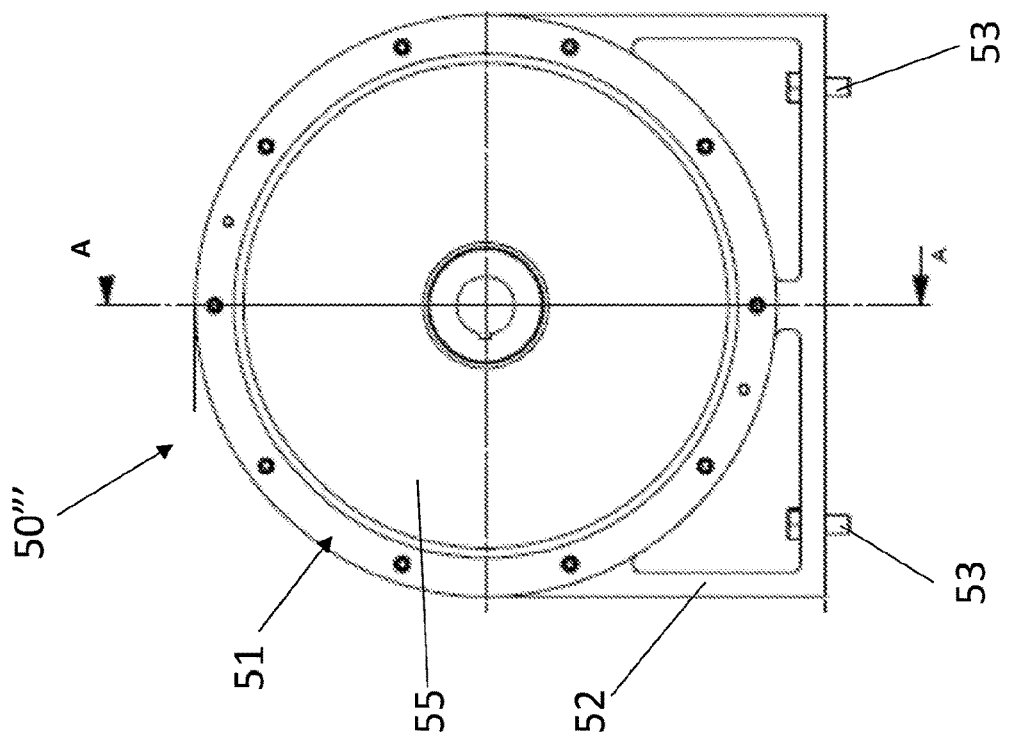
Figures 9D, 9E:
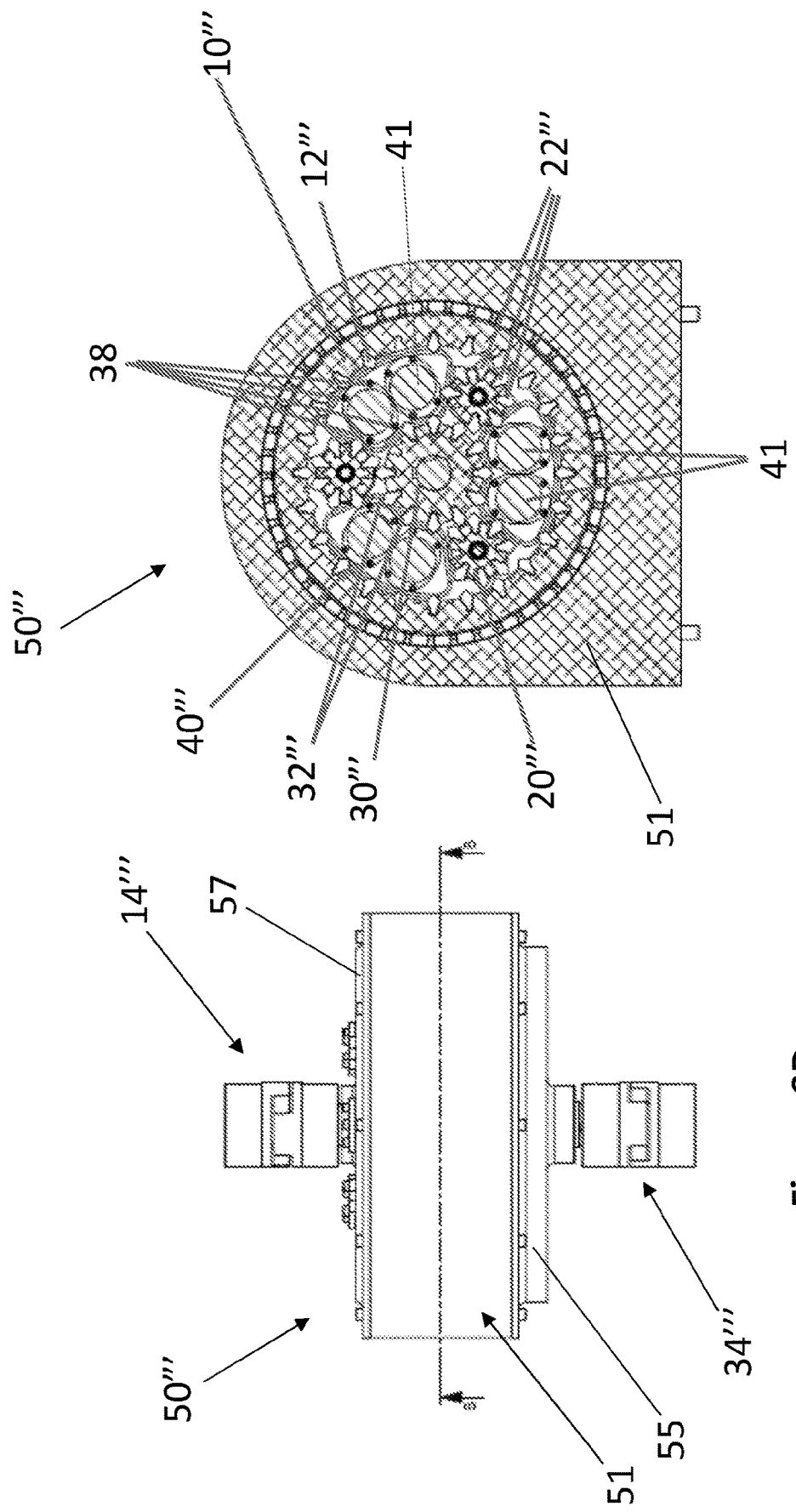
FIG. 9E shows a cross-sectional front view of the gearbox of FIGS. 9A, 9B and 9D taken on the line B-B of FIG. 9D.

With particular reference to FIGS. 9B and 9C, the gear box 50''' comprises a housing 51 with a stand 52 extending from the housing, the stand being mountable to a surface via fasteners 53. The assembly of gears within the gear box 50''' enables torque to be transferred from the input shaft 14''' to the output shaft 34'''. One end of the input shaft 14''' is connected to the motor output shaft 71 via a spider coupling 42 that is configured to allow a degree of flexibility in the connection between the motor and the input shaft 14'''. A drive gear in the form of sun gear 30''' is located and mounted on the other end of the input shaft 14'''. The input shaft 14''' is supported by and rotates on bearings 54 at housing 51.

In this embodiment, the location of the planetary gears 20''' is fixed relative to the sun gear 30''' (i.e. they do not revolve around the axis of the sun gear 30''') but they still translate drive to the ring gear 10''' about an axis that is co-linear with the axis of rotation of the input shaft 14'''. When the motor drives the input shaft 14''', the magnetic teeth 32''' of the sun gear 30''' mesh with the magnetic teeth 22''' of the planetary gears 20''' to drive the gears 20''' about gear shaft 46, supported via bearings 47. The planetary gear teeth mesh with the magnetic teeth of the ring gear 10''' and cause it to rotate about the sun gear axis.

The rotary motion of the ring gear 10''' is transferred to the output shaft 34''' via a drive plate 48. The drive plate 48 is connected to the ring gear 10''' around a periphery of the ring gear, thereby rotating with the ring gear. An inner portion of the drive plate 48 is journaled onto an end of the output shaft 34'''. The output shaft 34''' is in turn supported on bearings 56 located at a cover plate 55 for the housing 51. A similar cover plate 57 is provided at the input shaft side of the housing 51. The output shaft 34''' is coupled via a spider 58 to a desired input shaft of an output device. The cover plates 55, 57 enclose and protect the rotating gears and solenoids within the housing 51. Rotation of the ring gear is supported in relation to the housing 51 via bearings 59.

Embodiments of the magnetically assisted gearbox assembly can also act as a coupling. In such embodiments, since under normal conditions there is no mechanical contact, there would not be any vibrations transmitted through the coupling during normal operation. Additionally, since under normal conditions there is no mechanical contact the gearbox may operate substantially silently.

Some embodiments of the regenerative gearbox system 100 can lend themselves to being retrofitted into existing conventional transmissions.

For example, some embodiments of the magnetically assisted gear box can be retro-fit to operate on conventional boats having inboard motors. In a particular example, where the gearbox assembly can produce double the torque to a propeller shaft, then a larger propeller that spins slowly can be installed. Larger propellers that go slow may be approximately 20 to 30% more efficient. Therefore, in such embodiments, the overall efficiency of the boat may be improved by at least 20%.

There may also be many applications outside of the boating world for such quiet gears, such as within the pharmaceutical industry, within defence industry (e.g. in submarines), as well as for renewable energy platforms such as wind and hydro power turbines.

Variations and modifications may be made to the parts previously described without departing from the spirit or ambit of the disclosure.

For example, permanent magnets can be installed on a secondary gear and/or the input and output shaft of the gearbox. One or more coils can be exposed to the magnetic field generated by the rotation of the secondary gear and or shaft, thus generating the electrical current that is then harvested back to the power source.

In a further variation, a flywheel fitted with permanent magnets can be rotated through or near a coil adjacent the gearbox assembly to generate additional electrical current for harvest through the coil to the power source. The flywheel can be rotatably driven by the output shaft 34. For example, a plurality of magnets can be affixed to or inserted in the flywheel.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the system.

The invention claimed is:

1. A regenerative energy system, the system comprising:
a power source that is configured to drive a motor that rotates a drive gear about a drive gear axis, the drive gear comprising radially extending teeth arranged to project from a periphery of the drive gear;
a driven gear, the driven gear comprising radially extending teeth arranged to project from a periphery of the driven gear, the driven gear arranged to mesh with the teeth of the drive gear such that the driven gear is rotated about a driven gear axis when the drive gear is rotated by the motor;

permanent magnets disposed in some of the teeth of the drive gear and the driven gear such that the poles of the permanent magnets in the drive gear teeth repel the corresponding magnet-comprising teeth of the driven gear in use, but such that when magnetic repulsive forces between the teeth of the drive gear and the driven gear are overcome, the teeth of the drive gear and driven gear are arranged to engage with one another;

a coil in proximity to the permanent magnets, wherein electrical current is generated in the coil by a movement of the permanent magnets relative to the coil.

2. The regenerative energy system as claimed in claim 1, wherein the generated electrical current is transferred to the power source and/or to a control system for the regenerative energy system and/or to an auxiliary system or auxiliary services of the regenerative energy system.

3. The regenerative energy system as claimed in claim 2, wherein the generated electrical current is transferred to the power source simultaneously and continuously whilst the power source is driving the motor.

4. The regenerative energy system as claimed in claim 1, wherein each of the teeth of the drive gear and driven gear comprise a permanent magnet disposed therein.

5. The regenerative energy system as claimed in claim 1, wherein the permanent magnets of each of the drive gear and the driven gear are located in proximity to the coil such that a movement of the permanent magnet of the driven gear relative to the coil generates electrical current.

6. The regenerative energy system as claimed in claim 1, wherein an axis of the driven gear is parallel to and offset from an axis of the drive gear.

7. The regenerative energy system as claimed in claim 1, wherein an input shaft is connected to the drive gear and wherein an output shaft is coupled to the driven gear.

8. The regenerative energy system as claimed in claim 7, wherein the output shaft comprises a permanent magnet and teeth that engage with the teeth of at least one of the drive gear and/or driven gear, the output shaft teeth together forming part of an output gear that is rotatably driven about an output shaft axis by a relative rotation of the drive gear and/or driven gear.

9. The regenerative energy system as claimed in claim 8, wherein permanent magnets are disposed in each of at least some of the teeth of output gear, the permanent magnets of the output gear locating in proximity to the coil such that a movement of the permanent magnets of the output gear relative to the coil generates electrical current.

10. The regenerative energy system as claimed in claim 8, wherein the output gear is configured as a sun gear or a ring gear.

11. The regenerative energy system as claimed in claim 8, wherein the drive gear axis and output shaft axis are colinear.

12. The regenerative energy system as claimed in claim 8, wherein an output gear of the output shaft is a ring gear, and wherein at least one of the drive gear, driven gear, and the coil is/are located at least partially within an annular hollow of the output ring gear.

13. The regenerative energy system as claimed in claim 1, wherein an exposed surface of the teeth comprising the permanent magnet disposed therein comprises a protective layer of a non-brittle material such as silicone rubber, POM plastic, or a metal with low electromagnetic permeability such as aluminium or stainless steel, the protective layer configured to protect the permanent magnets in each of the teeth when the magnetic repulsive forces between the teeth are overcome.

14. The regenerative energy system as claimed in claim 1, wherein the drive gear is one of: a ring gear; a sun gear; or a planetary gear.

15. The regenerative energy system as claimed in claim 1, wherein the drive gear is larger than the driven gear or vice versa.

* * * * *